United States Patent
Kawaguchi et al.

(10) Patent No.: US 7,059,777 B2
(45) Date of Patent: Jun. 13, 2006

(54) ASSEMBLY FOR BALL BEARING WITH DOUBLE RACEWAY AND METHOD OF MANUFACTURING BALL BEARING WITH DOUBLE RACEWAY

(75) Inventors: Toshihiro Kawaguchi, Nara (JP); Hideo Ueda, Kanagawa (JP); Motoshi Kawamura, Aichi (JP)

(73) Assignee: Koyo Seiko Co., Ltd., Osaka (JP)

( * ) Notice: Subject to any disclaimer, the term of this patent is extended or adjusted under 35 U.S.C. 154(b) by 150 days.

(21) Appl. No.: 10/669,575

(22) Filed: Sep. 24, 2003

(65) Prior Publication Data

US 2004/0109624 A1 Jun. 10, 2004

(30) Foreign Application Priority Data

Feb. 12, 2002 (JP) ............................ P2002-349906
Sep. 30, 2002 (JP) ............................ P2002-286372

(51) Int. Cl.
*F16C 33/60* (2006.01)
*F16C 33/40* (2006.01)
*B21D 53/10* (2006.01)

(52) U.S. Cl. .................. 384/504; 29/898.06; 384/512; 384/523

(58) Field of Classification Search ................ 384/504, 384/512–516, 494, 523, 526, 527, 528, 534; 29/898.06, 898.07, 898.061, 898.062, 898.064
See application file for complete search history.

(56) References Cited

U.S. PATENT DOCUMENTS

| 1,325,113 | A | * | 12/1919 | Rohn ......................... 384/512 |
| 1,643,982 | A | * | 10/1927 | Delaval-Crow ........ 29/898.061 |
| 4,699,527 | A | * | 10/1987 | Hutzel ........................ 384/510 |
| 4,804,276 | A | * | 2/1989 | Olschewski et al. ........ 384/526 |
| 5,175,931 | A | * | 1/1993 | Ito ........................ 29/898.061 |
| 5,906,441 | A | * | 5/1999 | Seki ............................ 384/528 |
| 6,447,169 | B1 | * | 9/2002 | Chambert .................. 384/523 |
| 6,824,489 | B1 | * | 11/2004 | Jacob et al. ................ 475/247 |

FOREIGN PATENT DOCUMENTS

| GB | 206606 | * | 11/1923 |
| JP | 43-4721 | * | 2/1968 |
| JP | 44-26242 | * | 11/1969 |

* cited by examiner

*Primary Examiner*—Thomas R. Hannon
(74) *Attorney, Agent, or Firm*—Jordan and Hamburg, LLP

(57) ABSTRACT

An assembly for a ball bearing with double raceway assembled in an outer ring member provided with double row raceway surfaces apart from each other in an axial direction from one side in an axial direction, on an inner peripheral surface includes an inner ring member provided with double raceway surfaces apart from each other in an axial direction in correspondence to the double raceway surfaces on an outer peripheral surface, double row cages arranged in respective outer diameter sides of the double raceway surfaces of the inner ring member, and a plurality of ball rows respectively held by the double rows cages. The inner ring member is set to be non-separable from the respective cages and the respective ball rows, and can be assembled in the outer ring member from one side in the axial direction.

6 Claims, 19 Drawing Sheets

F I G. 9
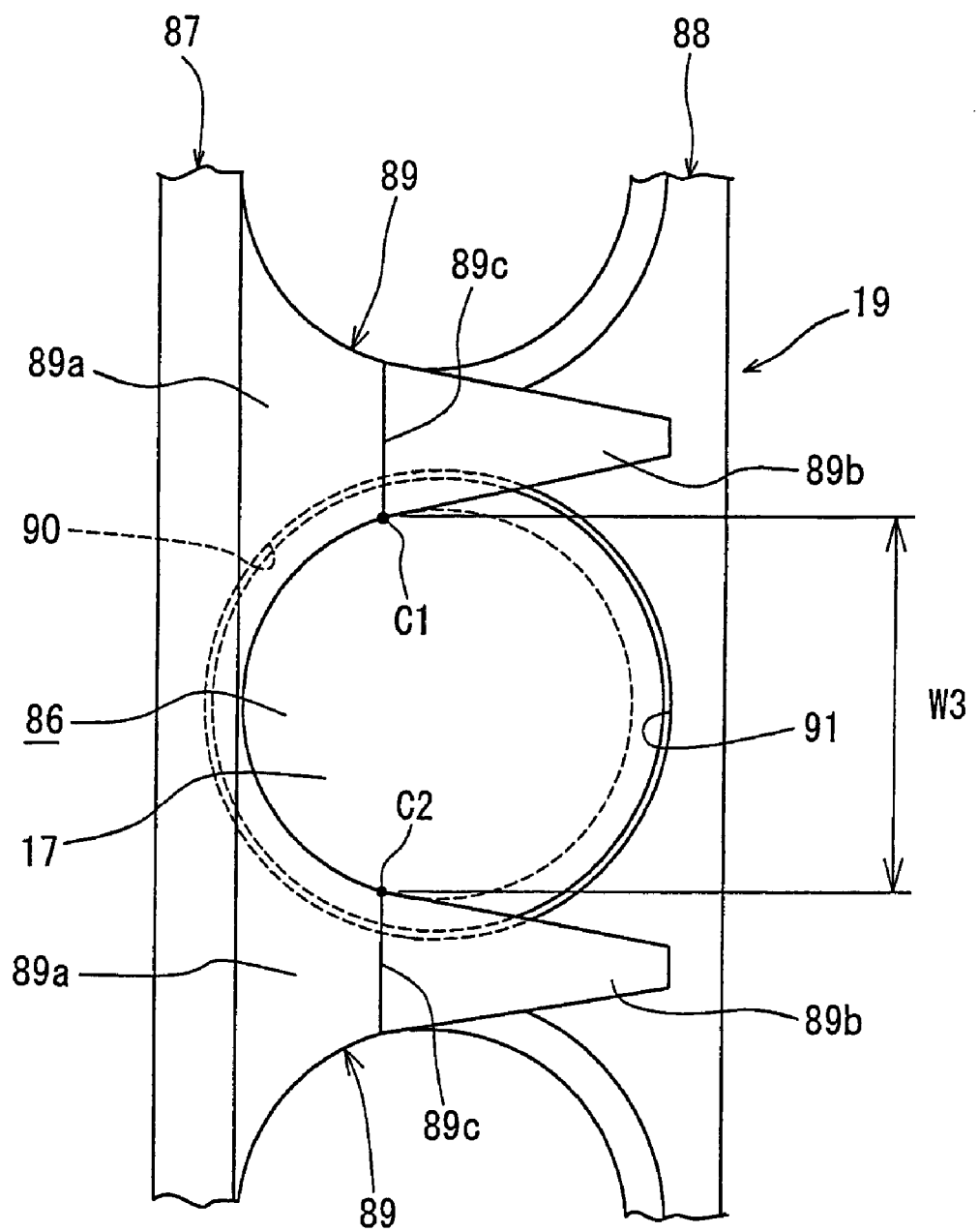

F I G. 10
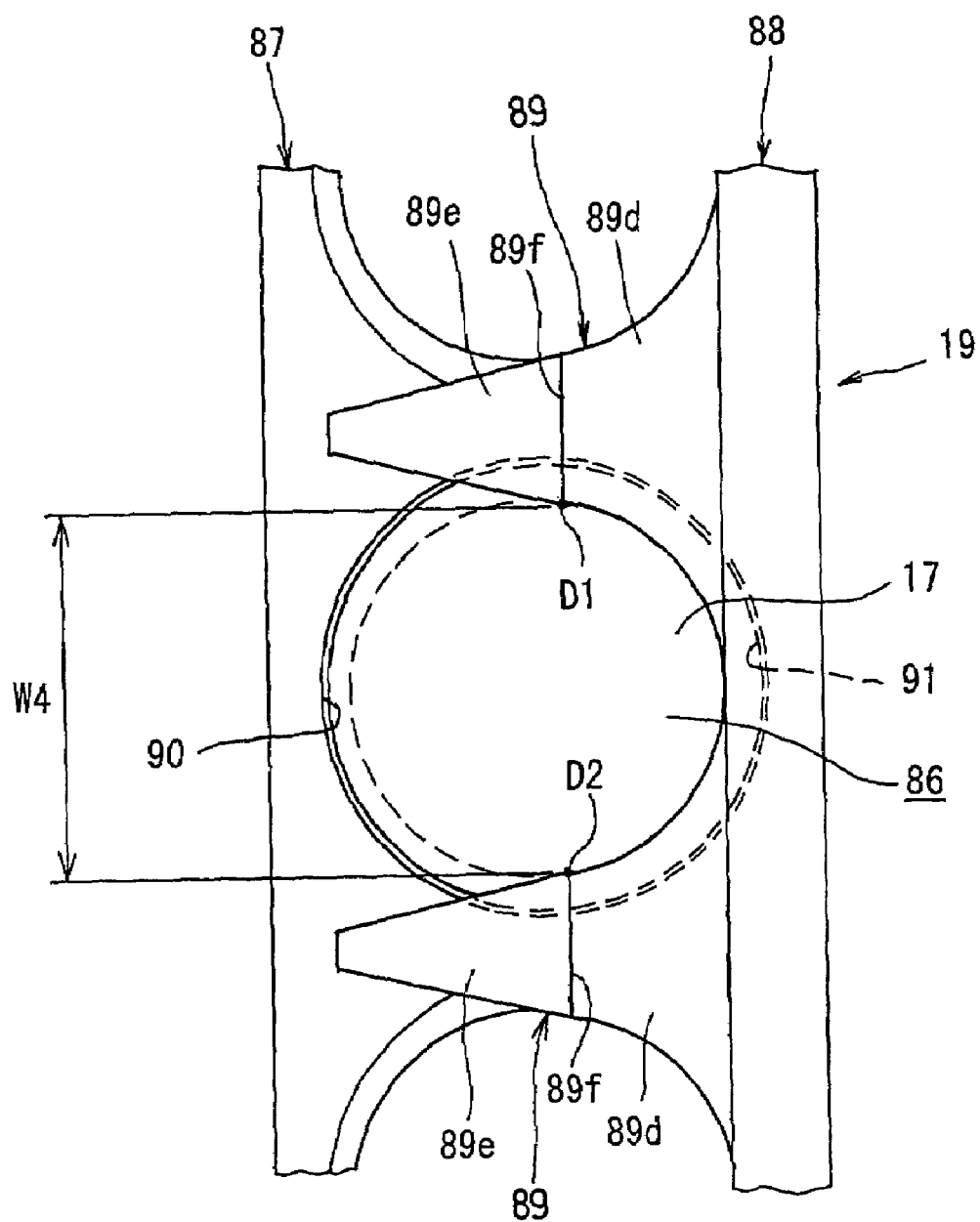

ASSEMBLY FOR BALL BEARING WITH DOUBLE RACEWAY AND METHOD OF MANUFACTURING BALL BEARING WITH DOUBLE RACEWAY

BACKGROUND OF THE INVENTION

The present invention relates to an assembly for a ball bearing with double raceway, and more particularly to an assembly for a ball bearing with double raceway which is preferably used in a pinion shaft such as a differential apparatus or the like, for example, mounted on a vehicle.

With reference to FIG. 22, a differential apparatus 60 disclosed in Japanese Unexamined Patent Publication No. 11-48805 is provided with a pinion shaft 63 within a differential case 61. The pinion shaft 63 has a pinion gear 62 engaging with a ring gear 77 of a differential speed change mechanism, in one side end portion in an axial direction.

The pinion shaft 63 is supported by tapered roller bearings 65 and 66 arranged apart in an axial direction so as to freely rotate around an axis. A companion flange 64 connected to a propeller shaft (not shown) is provided in an end portion of the pinion shaft 63.

The tapered roller bearing 65 is constituted by an outer ring member 69, and an inner ring side assembly in the outer ring member 69. The inner ring side assembly is constituted by an inner ring member 71, a plurality of tapered rollers 73 and a cage 75 holding the tapered rollers 73 at uniform positions in a circumferential direction.

The tapered roller bearing 66 is constituted by an outer ring member 70, and an inner ring side assembly in the outer ring member 70. The inner ring side assembly is constituted by an inner ring member 72, a plurality of tapered rollers 74 and a cage 76 holding the tapered rollers 74 at uniform positions in a circumferential direction.

A description follows of an assembling procedure of the differential apparatus 60, mainly with reference to a portion around the pinion shaft 63.

The outer ring members 69 and 70 are respectively pressure inserted against annular walls 67 and 68 of the differential case 61.

The inner ring side assembly constituted by the inner ring member 71, the tapered roller 73 and the cage 75 are assembled in such a manner that the inner ring member 71 is inserted into the pinion shaft 63.

The pinion shaft 63 in which the inner ring side member is assembled is assembled in the differential case 61 from one side of the differential case 61 in such a manner that the tapered roller 73 is brought into contact with a raceway surface of the outer ring member 69.

The inner ring side assembly constituted by the inner ring member 72, the tapered roller 74 and the cage 76 is assembled in the outer ring member 70 by inserting the inner ring side assembly into the pinion shaft 63 in such a manner that the tapered roller 74 is brought into contact with the raceway surface of the outer ring member 70.

A nut 75 is screwed with an outer end portion of the pinion shaft 63 close to the companion flange 64, and a predetermined pre-load is applied to the tapered roller bearings 65 and 66 by the pinion gear 62 and the companion flange 64.

In the differential apparatus 60, a large load is applied to the pinion shaft 63. Accordingly, a tapered roller bearing having a large load capacity is employed as a bearing for supporting the pinion shaft. The tapered roller bearing is of large load capacity, and on the other hand, has a large rolling resistance, thereby causing a reduction in efficiency of the differential apparatus 60.

SUMMARY OF THE INVENTION

In accordance with the present invention, there is provided an assembly for a ball bearing with double raceway comprising:

an inner ring member provided with a large-diameter raceway surface and a small-diameter raceway surface from one toward another in an axial direction on an outer peripheral surface;

double row cages arranged in outer diameter sides of the respective raceway surfaces in the inner ring member; and double ball rows respectively held in the cages, wherein the inner ring member, the respective cages and the respective ball rows are assembled in a non-separable manner so as to obtain an assembly, and the assembly is situated in an outer ring member provided with a large-diameter raceway surface and a small-diameter raceway surface from one toward another in an axial direction on an inner peripheral surface in correspondence to both the raceway surfaces from one side in the axial direction.

In accordance with the assembly for the ball bearing with double raceway of the present invention, the ball bearing with double raceway can be assembled by previously assembling the outer ring member, for example, in the case side of the differential apparatus, inserting the parts into the pinion shaft of the differential apparatus and fitting the respective ball rows of the assembly into the respective large-diameter and small-diameter raceway surfaces of the outer ring member.

In accordance with a preferable aspect of the present invention, the respective ball rows include a large-diameter side ball row interposed between the large-diameter raceway surface of the outer ring member and the large-diameter raceway surface of the inner ring member, and a small-diameter side ball row interposed between the small-diameter raceway surface of the outer ring member and the small-diameter raceway surface of the inner ring member, and a small-end side shoulder portion is formed in another side in the axial direction on the small-diameter raceway surface of the inner ring member, the small-end side shoulder portion having a larger diameter than a diameter of a bottom of the small-diameter raceway surface in the inner ring member and providing an obstruction for preventing the small-diameter side ball row from escaping to another side in the axial direction.

Since the small-diameter side ball row is prevented by the small-end side shoulder portion from escaping to another side in the axial direction, the assembly for the ball bearing with double raceway can be easily treated, and the assembly for the ball bearing with double raceway can be assembled in the outer ring member in the same manner as the case of employing the tapered roller bearing.

In accordance with a further preferable aspect of the present invention, an intermediate side shoulder portion is formed between the large-diameter raceway surface of the inner ring member and a small-diameter raceway surface of the inner ring member, the intermediate side shoulder portion having a larger diameter than a diameter of a bottom of the large-diameter raceway surface formed in the inner ring member and providing an obstruction for preventing the ball row of the large-diameter side assembly from escaping to another side in the axial direction.

The foregoing and other aspects become apparent from the following description of the invention when considered in conjunction with the accompanying drawing figures.

BRIEF DESCRIPTION OF THE DRAWINGS

FIG. 9 is a plan view of the cage as seen from an outer diameter side;

FIG. 10 is a plan view of the cage as seen from an inner diameter side;

DETAILED DESCRIPTION OF PREFERRED EMBODIMENTS

In a differential apparatus, in the case where a tapered roller bearing is employed for supporting a pinion shaft, the efficiency of the differential apparatus is lowered as mentioned above. In this case, it is considered that a tandem type ball bearing with double raceway is employed for supporting the pinion shaft, in place of the tapered roller bearing. In the case where the ball bearing with double raceway is employed for supporting the pinion shaft, in place of the tapered roller bearing, it may be required to change a line for assembling the tapered roller bearing in the differential apparatus for supporting the pinion shaft. The change of the line increases manufacturing cost, which is undesirable.

The inventors of the present invention devote themselves to research on the matter that the assembly line of the tapered roller bearing can be used for assembling the ball bearing with double raceway as it is, and accomplish the present invention.

In other words, in accordance with the present invention, three elements comprising the inner ring member, the respective cages and the respective ball rows are combined so as not to be separated, thereby being assembled with respect to the outer ring member from one side in an axial direction by using the assembly line of the tapered roller bearing as it is.

Figure 1:
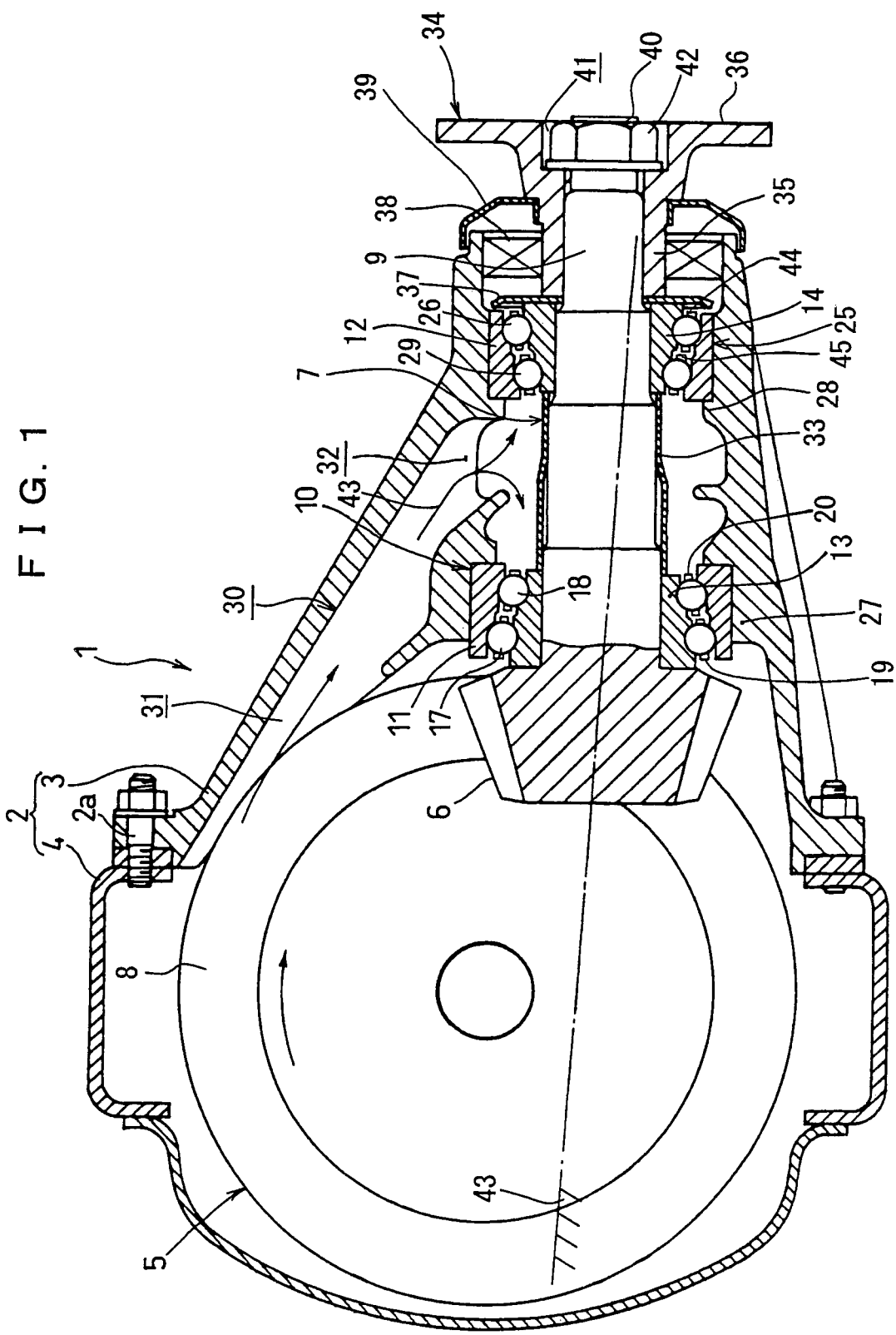
FIG. 1 is a cross sectional view showing an entire structure of a differential apparatus in accordance with a preferable embodiment of the present invention.

A description is given below of the present invention with reference to the accompanying drawings. FIG. 1 shows an entire structure of a differential apparatus in accordance with a preferable embodiment of the present invention. A differential apparatus 1 has a case 2. The case 2 is constituted by a front case 3 and a rear case 4. The cases 3 and 4 are integrally mounted by a bolt and nut 2a.

The case 2 has a differential speed change mechanism 5 for differentially making right and left wheels to interlock and a pinion shaft (a drive pinion) 7. The pinion shaft 7 has a pinion gear 6 at one side in an axial direction. The pinion gear 6 is engaged with a ring gear 8 of the differential speed change mechanism 5. A shaft portion 9 of the pinion shaft 7 is structured such that an outer peripheral surface is formed in a step shape in such a manner that one side in an axial direction has a larger diameter than another side.

The shaft portion 9 of the pinion shaft 7 is supported by the case 2 via a ball bearing with double raceway 10 in one side (close to the pinion gear) in an axial direction so as to be rotatable around an axis. The shaft portion 9 of the pinion 7 is supported by the case 2 via a ball bearing with double raceway 25 in another side (apart from the pinion gear) in the axial direction so as to be rotatable around the axis. The ball bearings with double raceway 10 and 25 are hereinafter referred to simply as the bearings 10 and 25.

Annular walls 27 and 28 for attaching the bearings are formed in an inner side of the case 3. Respective outer ring members 11 and 12 of the bearings 10 and 25 are fitted and attached in respective inner peripheral surfaces of the annular walls 27 and 28.

The bearings 10 and 25 are structured so as to be symmetrical with respect to the axial direction of the pinion shaft 7. A diameter of the bearing 25 is set to be smaller by just that much fitting into a small-diameter portion of the pinion shaft 7 than a diameter of the bearing 10.

The bearing 25 has a single inner ring member 14, the single outer ring member 12, two rows of balls 26 and 29 having different pitch circle diameters, and two rows of cages 44 and 45. The inner ring member 14 is fitted into a middle portion of the pinion shaft 7 in the axial direction.

Since the bearings 10 and 25 is formed into a symmetrical shape in the axial direction and are different only in the diameter, a description is given below of a structure of the bearing 10 and the description also serves for the bearing 25.

Figure 2:
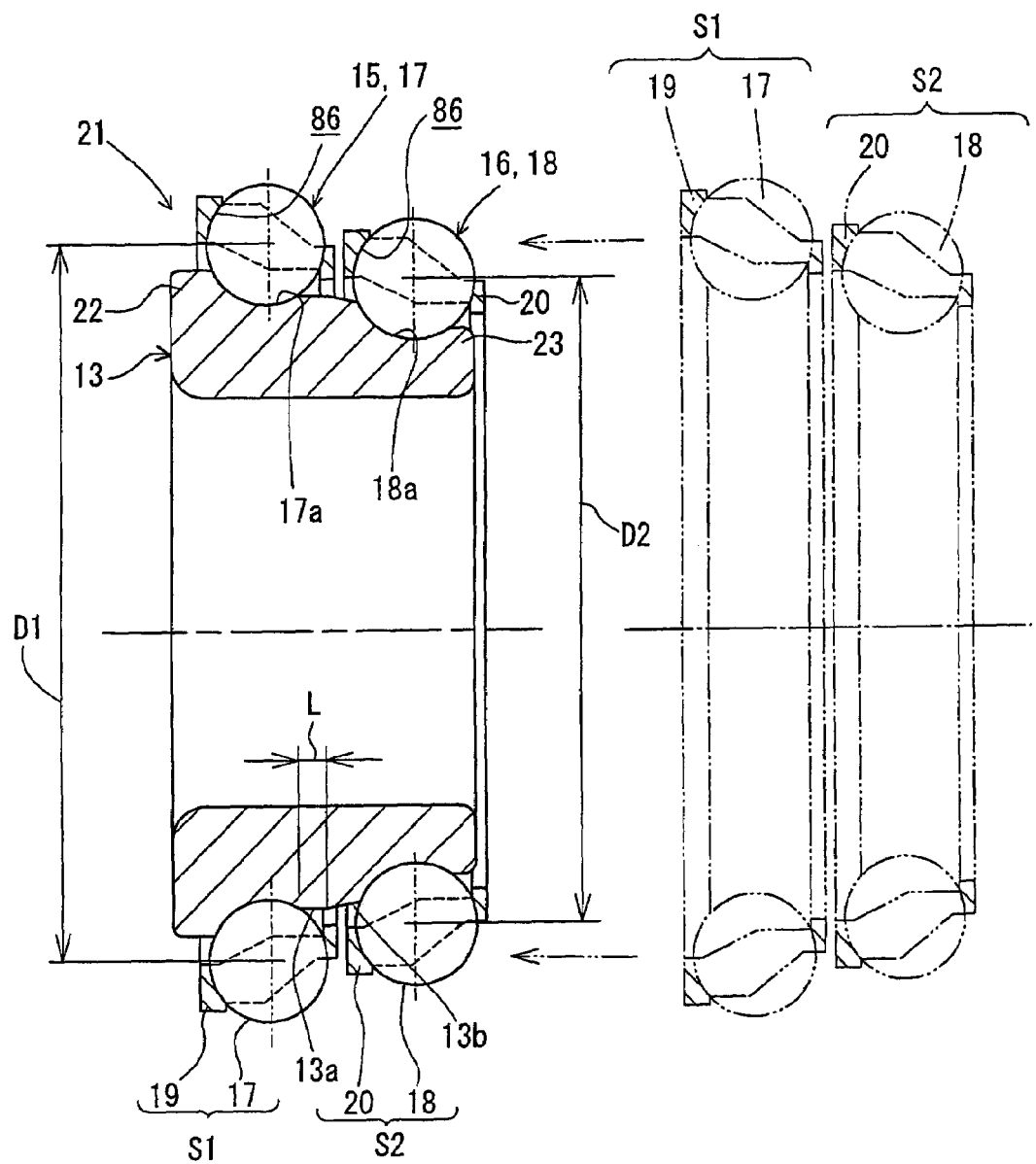
FIG. 2 is an enlarged cross sectional view of an assembly for a ball bearing with double raceway.
Figure 3:
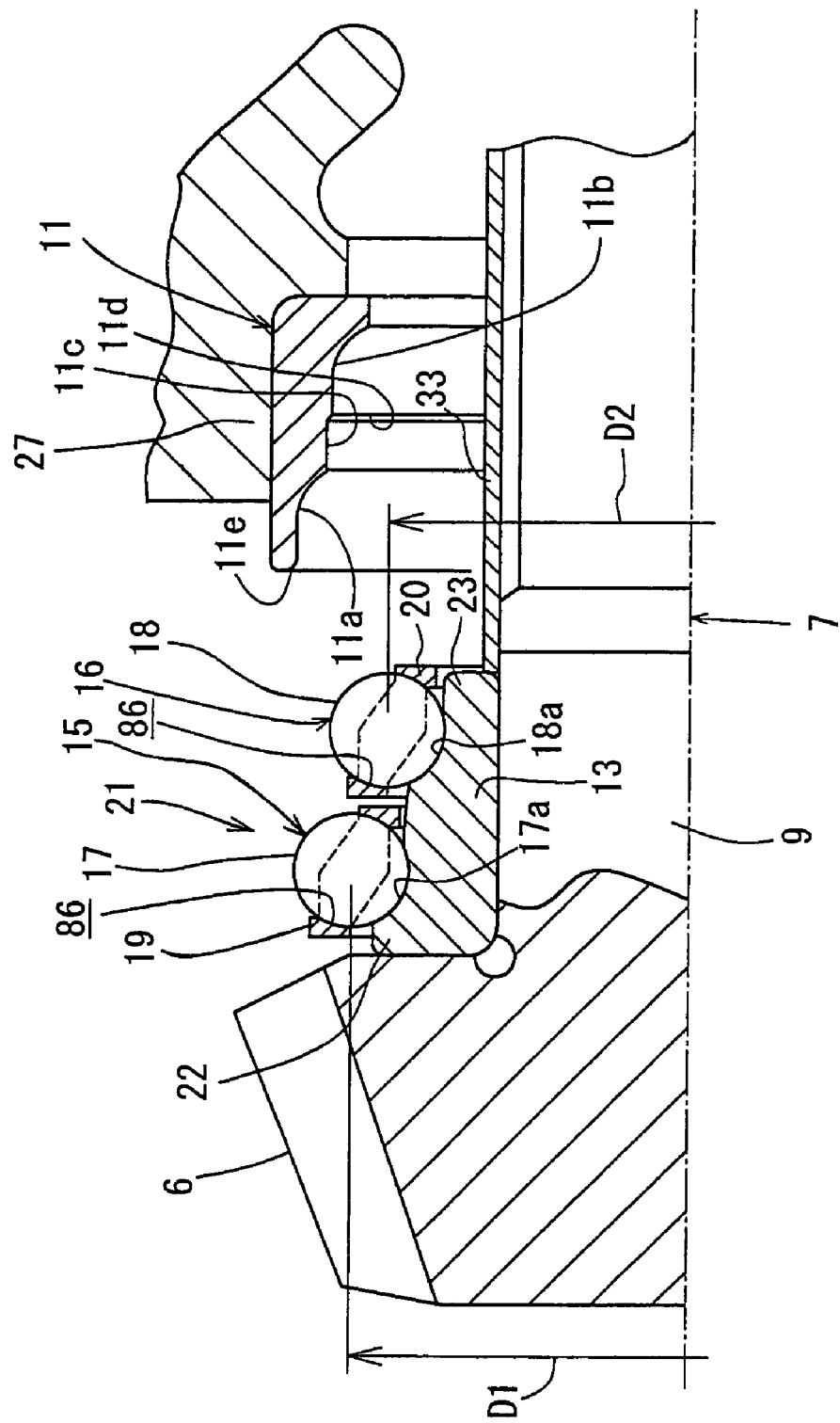
FIG. 3 is an enlarged cross sectional view at the time of assembling the assembly for the ball bearing with double raceway in an outer ring member.

The bearing 10 is constituted by the single outer ring member 11, and an inner ring side assembly 21 constituting an assembly for the rolling bearing with double raceway shown in FIG. 2. As shown in FIG. 3, the outer ring member 11 is structured such that an inner peripheral surface thereof is formed in a step shape. The outer ring member 11 is provided on the inner peripheral surface with large-diameter and small-diameter raceway surfaces (outer ring raceway surfaces) 11a and 11b from one side in the axial direction toward another side in the axial direction, and has an annular surface 11c between both the raceway surfaces 11a and 11b. An inclined surface 11d expanded in diameter toward another side and connected to the small-diameter raceway surface 11b is formed in an end portion of the annular surface 11c. A guide surface 11e contracted in diameter toward another side in the axial direction is formed in one side of the inner peripheral surface of the outer ring member 11.

As shown in FIG. 2, the assembly 21 has an inner ring member 13 arranged in an inner side of the outer ring member 11 in the diametrical direction, large-diameter side and small-diameter side ball rows 15 and 16 interposed between the outer ring member 11 and the inner ring member 13, and large-diameter and small-diameter cages 19 20 respectively holding balls 17 and 18 constituting the ball rows 15 and 16. The ball rows 15 and 16 are different from each other in pitch circle diameters D1 and D2.

Respective diameters of the balls 17 and 18 are substantially the same as each other. The inner ring member 13 in the assembly 21 is outward fitted and inserted into one side end portion of the shaft portion 9 in the pinion shaft 7. One side end surface in the inner ring member 13 is brought into contact with another side end surface of the pinion gear 6 in the axial direction.

An outer peripheral shape of the inner ring member 13 is formed in a step shape. In detail, the inner ring member 13 is provided on an outer peripheral surface with large-diameter and small-diameter raceway surfaces (inner ring raceway surfaces) 17a and 18a from one side in the axial direction toward another side in the axial direction, and has an annular surface between both the raceways surfaces 17a and 18a.

The annular surface has a tubular surface 13a, and an inclined guide surface 13b coming next to the tubular surface 13a. The tubular surface 13a has a predetermined length L in the axial direction. A diameter of the tubular surface 13a is formed slightly larger than a diameter of a bottom of the large-diameter raceway surface 17a to prevent the ball 17 from escaping to another side in the axial direction.

Shoulder portions 22 and 23 are respectively formed in a large end portion and a small end portion of the inner ring member 13. A diameter of the shoulder portion 23 in the side of the small end portion is formed slightly larger than a diameter of a bottom of the small-diameter raceway surface 18a. Accordingly, the shoulder portion 23 prevents the small-diameter side ball row 16 from escaping to another side in the axial direction. Chamfers are applied to outer peripheral corner portions of the shoulder portions 22 and 23.

Figure 4:
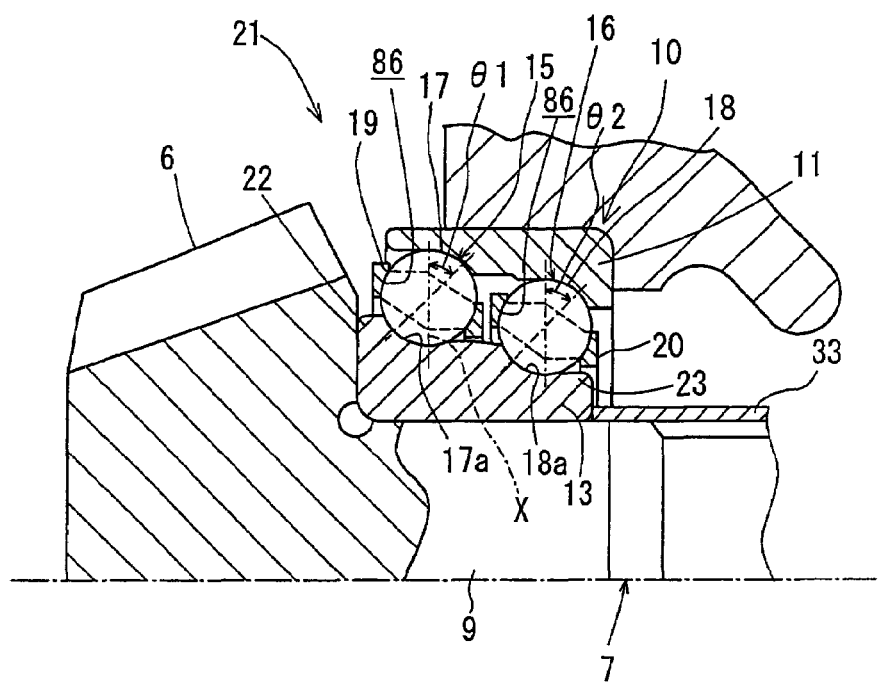
FIG. 4 is an enlarged cross sectional view after assembling the assembly for the ball bearing with double raceway in the outer ring member.

As shown in FIG. 4, when the assembly 21 is assembled in the outer ring member 11 from one side in the axial direction toward another side in the axial direction, respective contact angles θ1 and θ2 of the balls 17 and 18 are set to necessary angles in correspondence to a load application.

The outer ring member 11 has the large-diameter raceway surface 11a and the small-diameter raceway surface 11b, the inner ring member 13 has the large-diameter raceway surface 17a and the small diameter raceway surface 18a, and the balls 17 and 18 constituting the large-diameter side ball row 15 and the small-diameter side ball row 16 have the same diameter. Accordingly, the pitch circle diameters D1 and D2 of the large-diameter side ball row 15 and the small-diameter side ball row 16 are different. The bearing 10 mentioned above is called a tandem type roller bearing.

A description is given of a structure of the cages 19 and 20 of the bearings 10 and 25 with reference to FIGS. 5 to 10. The cages 19 and 20 are respectively different from each other only in the diameter and the number of pockets. The number of the pockets 89 of the small-diameter cages 20 is smaller than the number of the pockets 89 of the large-diameter cage 19. Accordingly, a description is given below of the structure of the large-diameter cage 19 and the description also serves for the small-diameter cage 20.

Figure 5:
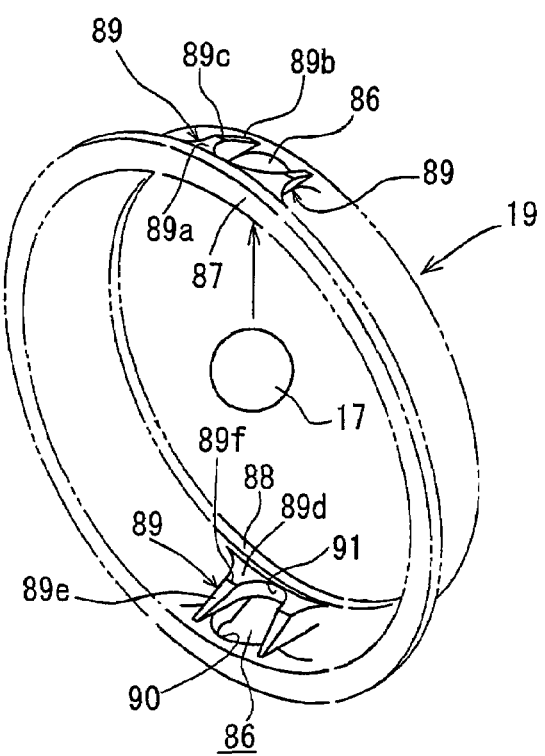
FIG. 5 is a perspective view of a large-diameter cage as seen from one side.
Figure 6:
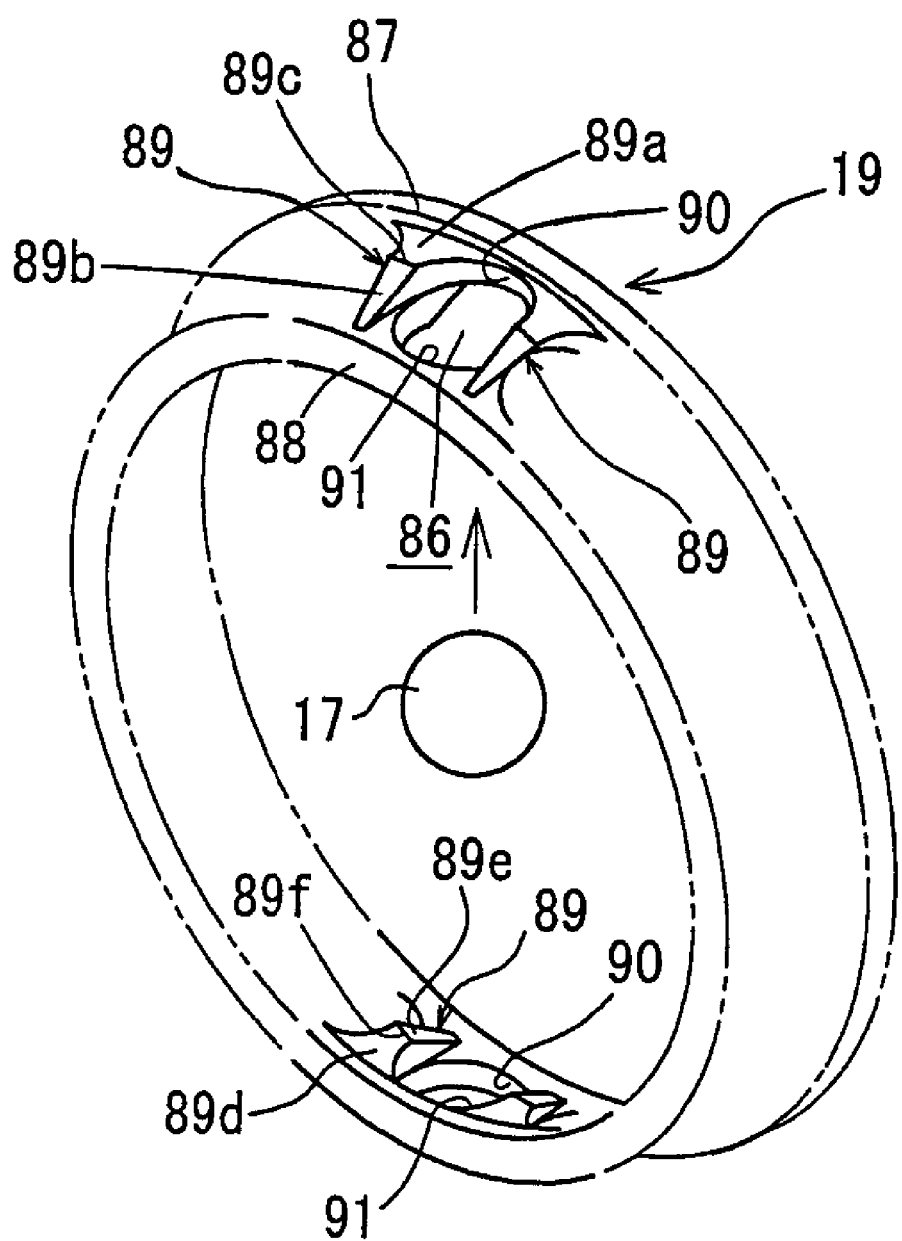
FIG. 6 is a perspective view of the large-diameter cage as seen from another side.

With reference to FIGS. 5 and 6, the plurality of pockets 86 for attaching the ball 17 to a plurality of portions of a circumference of an annular body is formed in the large-diameter cage 19. Each pocket 86 is formed by penetrating the annular body in a direction along a load application line X (refer to FIG. 4).

Figure 7:
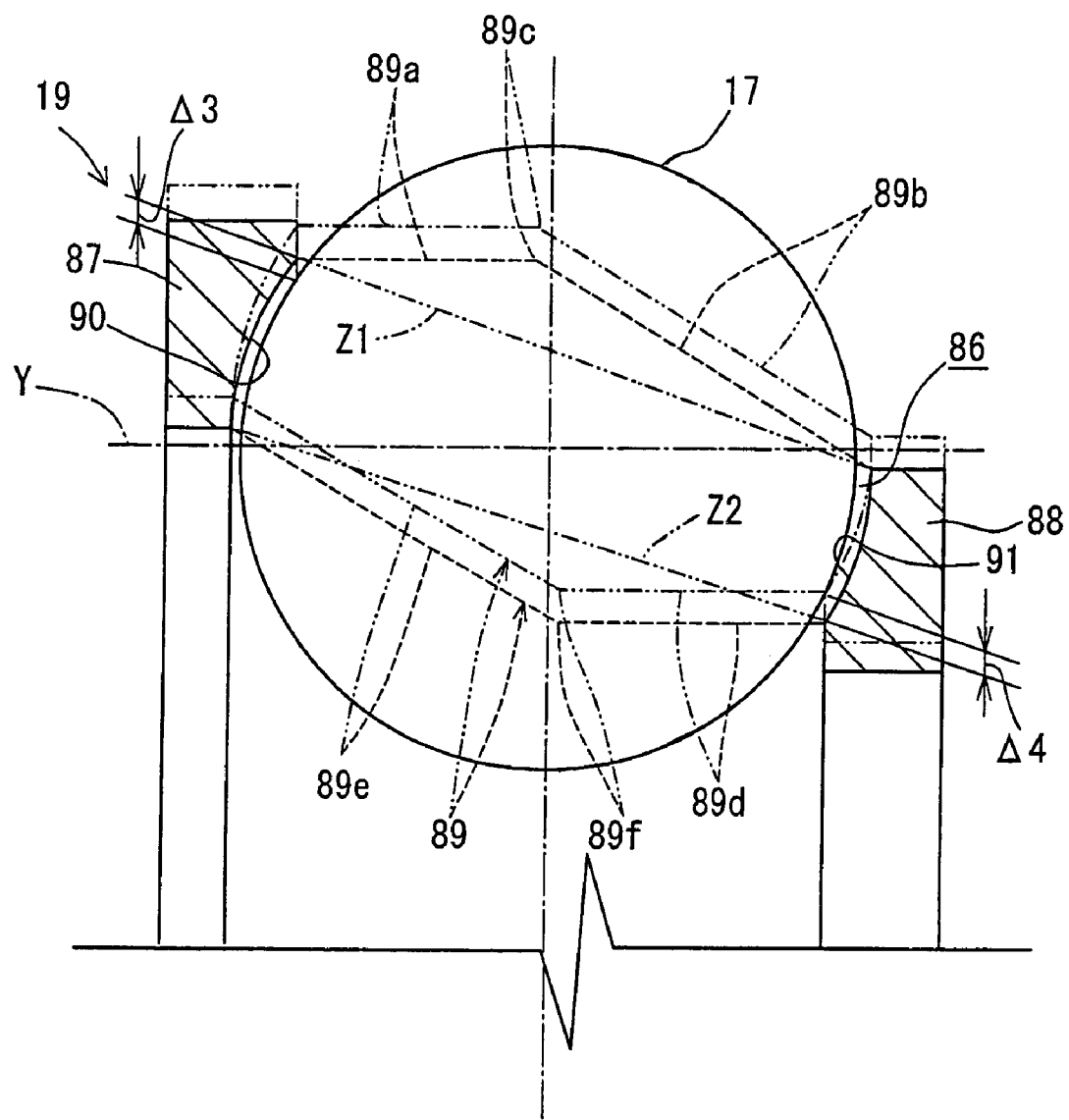
FIG. 7 is a partly cross sectional view of the cage in a state in which the cage holds a ball.
Figure 8:
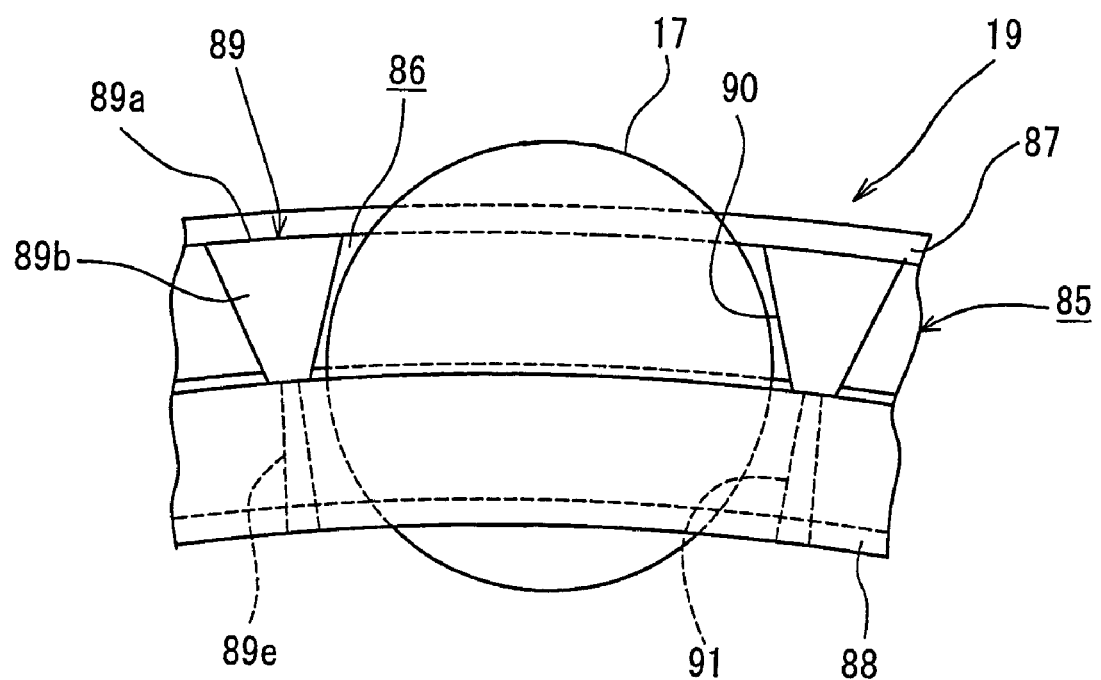
FIG. 8 is a partly side elevational view of the cage in a state in which the cage holds the ball.

With reference to FIG. 7, the large-diameter cage 19 is provided with a large ring portion 87, a small ring portion 88 and a plurality of bridge portions (columns) 89. The large ring portion 87 is formed in an outer diameter side from a virtual cylindrical surface Y obtained by extending a pitch circle diameter of each of the pockets 86 (a diameter of a circle connecting the centers of the pockets 86) in the axial direction. The small ring portion 88 is formed in an inner diameter side from the virtual cylindrical surface Y. With reference to FIG. 8, the bridge portions 89 are formed so as to connect several portions of the circumferences of the large ring portion 87 and the small ring portion 88.

The pocket 86 is structured by combining approximately semicircular first and second recess portions 90 and 91. The first recess portion 90 is formed by the large ring portion 87 and two bridge portions 89 adjacent in a peripheral direction. The second recess portion 91 is formed by the small ring portion 88 and two bridge portions 89 adjacent in the peripheral direction.

In the bridge portions 89 and 89, an inner surface of the first recess portion 90 and an inner surface of the second recess portion 91 are formed into a spherical recess surface having the same curvature as an outer peripheral curvature of the ball 17.

On an outer peripheral surface of the bridge portion 89, a flat surface 89a along the axial direction and an inclined surface 89b with respect to the axial direction are formed so as to be continuously provided in the center in the axial direction. A connection portion 89c between the flat surface 89a and the inclined surface 89b is arranged in an outer diameter side from a virtual conical surface Z1 obtained by connecting the large ring portion 87 and the small ring portion 88 by a line.

In an inner peripheral surface of the bridge portion 89, a flat surface 89d extending along the axial direction and an inclined surface 89e with respect to the axial direction are formed so as to be connected in a center position in the axial direction. A connection portion 89f between the flat surface 89d and the inclined surface 89e is arranged in an inner diameter side from a virtual conical surface Z2 obtained by connecting the large ring portion 87 to the small ring portion 88 by a line.

In FIG. 9, reference symbol W3 denotes an interval between opening edges C1 and C2 of a first recess portion 90 in an outer diameter side. In FIG. 10, reference symbol W4 denotes an interval between opening edges D1 and D2 of a second recess portion 91 in an inner diameter side. These intervals W3 and W4 are both set smaller than a diameter of the ball 17, and are set so as to satisfy a relation of interval W4>interval W3.

In accordance with the structure mentioned above, in the large-diameter cage 19, since the opening edges C1 and C2 and the opening edges D1 and D2 have a function as the come-off prevention structure, the ball 17 escapes to neither the side of the inner diameter nor the side of the outer diameter from an inner side of the pocket 86. The ball 17 is forcedly fitted into the pocket 86 from the side of the inner diameter.

With reference to FIG. 7, in a state in which a center of the pocket 86 corresponds to the center of the ball 17, a radial gap A3 between an outer diameter edge of the first recess portion 90 and the ball 17 becomes approximately the same in amount as a radial gap A4 between an inner diameter edge of the second recess portion 91 and the ball 17. The structures of the large-diameter cage 19 and the small-diameter cage 20 are as described above.

With reference to FIG. 1, the differential apparatus 1 has a plastic spacer 33. The plastic spacer 33 is arranged at a middle position of the shaft portion 9 in the pinion shaft 7 between mutually opposing end surfaces of the inner ring member 13 of the bearing 10 and the inner ring member 14 of the bearing 25, so as to be outward fitted.

An oil circulation passage 30 is formed between an inner wall of the front case 3 and an annular wall 27. An oil inlet 31 of the oil circulation passage 30 is open to the side of the ring gear 8 of the oil circulation passage 30. An oil outlet 32 of the oil circulation passage 30 is open to a portion between the annular walls 27 and 28.

The differential apparatus 1 has a companion flange 34. This flange 34 has a body portion 35 and a flange portion 36 integrally formed with the body portion 35. The body portion 35 is outward fitted to another side of the shaft portion 9 in the pinion shaft 7.

A shielding plate 37 is interposed between one side end surface of the body portion 35 and an end surface of the inner ring member 14 of the bearing 25. An oil seal 38 is arranged between an outer peripheral surface of the body portion 35 and another side opening inner peripheral surface of the front case 3. A seal protection cup 39 for covering the oil seal 38 is mounted to another side opening portion of the case 3. A screw portion 40 is formed in another side outer end portion of the shaft portion 9, and the screw portion 40 protrudes to a center recess portion 41 of the flange portion 36. A nut 42 is engaged with the screw portion 40.

The inner ring member 13 of the bearing 10 and the inner ring member 14 of the bearing 25 are clamped in the axial direction by the end surface of the gear 6 and the end surface of the flange 34 by screwing the nut 42 into the screw portion 40, and a predetermined preload is applied to the bearings 10 and 25 via the shielding plate 37 and the plastic spacer 33.

In the differential apparatus 1, oil 43 for lubricating is reserved within the case 2 at a predetermined level under a shutdown state. The oil 43 is spattered up in accordance with a rotation of the ring gear 8 at the time of operating, is introduced so as to be supplied to the bearings 10 and 25 through the oil circulation passage 30 within the case 3, and circulates within the case 2 so as to lubricate the bearings 10 and 25.

A description is given of assembling method of the differential apparatus 1. First, a description is given of an assembly sequence of the inner ring side assembly 21 in the bearing 10.

A large-diameter side assembly S1 is formed by forcedly fitting the ball 17 constituting the ball row 15 into the pocket 86 of the large-diameter cage 19 from the inner diameter side. A small-diameter side assembly S2 is formed by forcedly fitting the ball 18 constituting the ball row 16 into the pocket 86 of the small-diameter cage 29 from the inner diameter side. In the assemblies S1 and S2 in which the balls 17 and 18 are respectively attached to the cages 19 and 20, the balls 17 and 18 are prevented from escaping to the inner and outer diameter sides from the cages 19 and 20, owing to the structures of the cages 19 and 20.

In the large-diameter side assembly S1, the diameter of the virtual circle obtained by connecting the inner side outer peripheral surfaces of the respective balls 17 in a state of being held in the large-diameter cage 19 is slightly smaller than a diameter of the inner ring annular surface (the tubular surface 13a). In the small-diameter side assembly S2, the diameter of the virtual circle obtained by connecting the inner side outer peripheral surfaces of the respective balls 18 in a state of being held in the small-diameter cage 20 is slightly smaller than a diameter of the shoulder portion 23 in another side.

The assemblies S1 and S2 are respectively assembled in the inner ring member 13 in such a manner that the balls 17 and 18 of the assemblies S1 and S2 are respectively fitted into the raceway surfaces 17a and 18a, whereby the inner ring side part 21 is structured.

When the assemblies S1 and S2 are assembled in the inner ring member 13, the ball 17 of the assembly S1 is guided by the guide surface 13b in the outer peripheral surface of the inner ring member 13, thereafter passes through the tubular surface 13a, and is fitted into the large-diameter raceway surface 17a. Since the diameter of the tubular surface 13a is slightly larger than the raceway diameter of the large-diameter raceway surface 17a, the assembly S1 is prevented from escaping from the inner ring member 13 to another side, that is, coming off. Of course, the assembly S1 is prevented from escaping to one side by the shoulder portion 22. In addition, each of the balls 17 is prevented from escaping to the outer diameter side owing to the structure of the large-diameter cage 19. Accordingly, the assembly of the inner ring member 13 and the large-diameter side article S1 is formed at this time.

After assembling the assembly S1 in the inner ring member 13 in the manner mentioned above, the assembly S2 is assembled in the inner ring member 13 from another side. At this time, the diameter of the shoulder portion 23 of the inner ring member 13 is formed slightly larger than a diameter of the bottom of the small-diameter raceway surface 18a. Since the shoulder portion 23 is chamfered, the ball 18 of the assembly S2 is smoothly guided by the chamfer portion, gets over the shoulder portion 23 owing to the forcedly fitting, and thereafter is fitted into the small-diameter raceway surface 18a. In accordance with the structure mentioned above, since the diameter of the shoulder portion 23 is slightly larger than the diameter of the bottom of the small-diameter raceway surface 18a, the assembly S2 is prevented from escaping from the inner ring member 13 to another side. In addition, each of the balls 18 is prevented from escaping to the outer diameter side owing to the structure of the small-diameter cage 20.

The assembly of the assembly 21 is finished in the manner mentioned above. Accordingly, the assembly 21 is structured such that the inner ring member 13 and the assemblies S1 and S2 are integrally formed, and is extremely easily handled. The same operations and effects are applied to the inner ring side assembly (not shown) constituted by the large-diameter side assembly, the small-diameter side assembly and the inner ring member 14 in the bearing 25.

In a state in which the front case 3 and the rear case 4 are still separated, the outer ring member 11 in the bearing 10 is assembled in the front case 3. At this time, the outer ring member 11 is pressure inserted up to an axial predetermined position where the outer ring member 11 is brought into contact with the step portion formed in the annular wall 27 from one side opening of the front case 3. The outer ring member 12 of the bearing 25 is pressure inserted up to an axial predetermined position where the outer ring 12 is brought into contact with the step portion formed in the annular wall 28 from another side opening of the front case 3.

In addition to this, the inner ring side assembly 21 in the side of the bearing 10 is assembled in the shaft portion 9 of the pinion shaft 7. In other words, the inner ring side assembly 21 is positioned at the side of the pinion gear 6 of the shaft portion 9 in the pinion shaft 7 by inserting the inner ring member 13 of the inner ring side assembly 21 into the shaft portion 9 of the pinion shaft 7.

The pinion shaft 7 to which the inner ring side assembly 21 is mounted in the manner mentioned above is assembled in the front case 3 from the small diameter side and from one side opening of the front case 3, in such a manner that the ball 18 in the inner ring side assembly 21 is fitted into the small-diameter raceway surface 11b of the outer ring member 11, and the ball 17 in the inner ring side assembly 21 is fitted into the large-diameter raceway surface 11a of the outer ring member 11.

At this time, the ball 18 of the inner ring side assembly 21 is guided by the guide inclined surface 11d formed in the outer ring annular surface 11c, and the ball 17 is arranged by the guide surface 11e, thereby being smoothly fitted into the respective raceway surfaces 11a and 11b.

Next, the spacer 33 is outward fitted and inserted into the shaft portion 9 of the pinion shaft 7 from another side opening of the front case 3. Subsequently, the inner ring side assembly in the bearing 25 is attached to the shaft portion 9 of the pinion shaft 7 from another side opening of the case 3. In this case, the inner ring member 14 of the inner ring side assembly is inserted into the shaft portion 9 of the pinion shaft 7, and the balls 26 and 29 are fitted into the raceway surface of the outer ring member 12. Operations and effects in this case are the same as those in the case where the inner ring side assembly 21 in the bearing 10 is assembled in the outer ring member 11.

Thereafter, the shielding plate 37 is inserted into the shaft portion 9 of the pinion shaft 7 from another side opening of the case 3, an oil seal 38 is attached, and a seal protection cup 39 is mounted to another side opening portion of the case 3. The body portion 35 of the companion flange 34 is inserted through the cup 39, and an end surface thereof is brought into contact with the shielding plate 37. Subsequently, a predetermined preload is applied to each of the bearings 10 and 25 by engaging the nut 42 of the shaft portion 9 with the screw portion 40 and pressing the spacer 33 in an axial direction.

As mentioned above, the bearing 10 for supporting the shaft portion 9 of the pinion shaft 7 so as to be rotatable in one side is constituted by the outer ring member 11 and the inner ring side assembly 21. The inner ring side assembly 21 is constituted by the single inner ring member 13, the ball rows 15 and 16 which are interposed between the outer ring member 11 and the inner ring member 13, respectively having the different pitch circle diameters D1 and D2, and the cages 19 and 20 respectively holding the balls 17 and 18 constituting the ball rows 15 and 16. Further, the balls 17 and 18 in both rows are respectively prevented from escaping to the outer diameter side by the cages 19 and 20. Further, the assemblies S1 and S2, prevented from escaping from the inner ring member 13 in the axial direction, are held in the inner ring member 13.

Accordingly, even in the case where the tandem type ball bearing with double raceway 10 is employed in place of the tapered roller bearing arranged as the roller bearing apparatus for supporting the pinion shaft, the inner ring member 13, the ball rows 15 and 16 and the cages 19 and 20 can be handled as one inner ring side assembly 21, in the same manner as the case where the tapered roller bearing is employed. Therefore, in comparison with the case where the tapered roller bearing is employed, a workability at the time of assembling the differential apparatus 1, particularly at the time of assembling in the bearing portion, is not diminished. In connection with this point, the same operation and effect can be achieved in the case of the bearing 25 rotatably supporting the pinion shaft 7 at another side.

Further, in accordance with the embodiment of the present invention, since the bearing (the ball bearing) 10 having the smaller rolling resistance than the tapered roller bearing is used close to the pinion gear 6 to which great thrust load is applied, rotation torque becomes small in comparison with the case where the tapered roller bearing is used. Accordingly, an efficiency of the differential apparatus 1 is improved. Further, in accordance with the embodiment of the present invention, since the ball bearing with double raceway 10 is used in place of the ball bearing with single raceway, the load capacity can be made large in comparison with the ball bearing with single row, so that a sufficient support rigidity can be obtained.

In addition, in accordance with the embodiment of the present invention, the bearing 10 employs the tandem type ball bearing with double raceway in which the pitch circle diameter D1 of the ball row 15 is made larger than the pitch circle diameter D2 of the ball row 16, thereby increasing the number of the balls 17 in the ball row 16 close to the pinion gear 6 to which a greater thrust load is applied, and allowing the bearing to handle the great load.

In the embodiment mentioned above, the ball bearings 10 and 25 are used for both side bearings supporting the pinion shaft 7, but this is not a limitation. In other words, the ball bearing with double raceway 10 may be used as the bearing for supporting the shaft portion 9 of the pinion shaft 7 at one side thereof, and the conventionally used tapered roller bearing with single raceway may be used as the bearing for supporting at the other side. Even in this case, the assembling work of the differential apparatus 1, particularly the workability at the time of assembling in the bearing portion is not diminished, in the same manner as the embodiment mentioned above.

Figure 11:
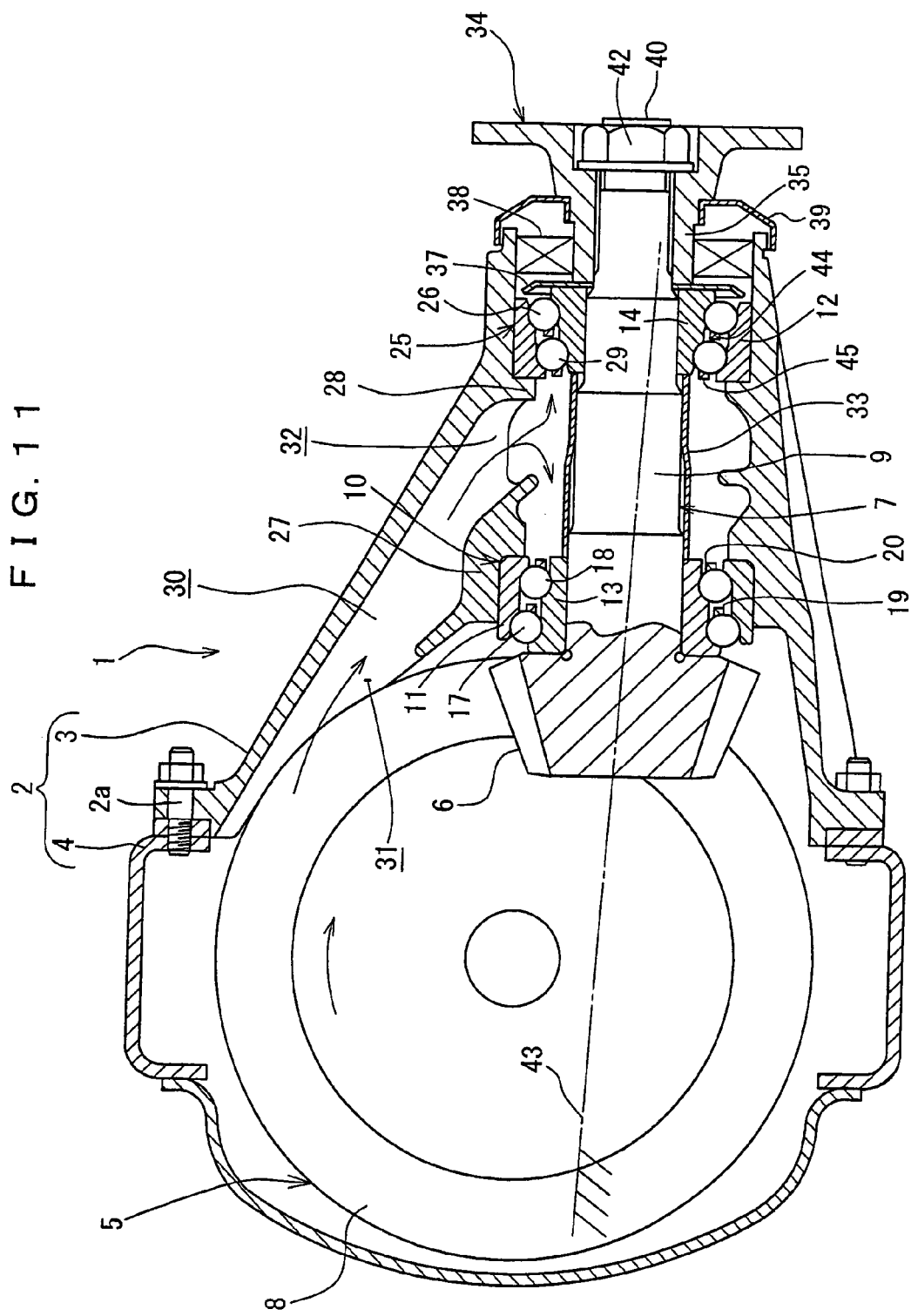
FIG. 11 is a cross sectional view showing an entire structure of a differential apparatus in accordance with another preferable embodiment of the present invention.

ANOTHER EMBODIMENT (1) A description is given of a ball bearing with double raceway in accordance with another embodiment of the present invention with reference to FIGS. 11 to 14. The same reference numerals are attached to portions corresponding or similar to those in FIGS. 1 to 10. FIG. 11 shows an entire differential apparatus 1. Since a structure of the differential apparatus 1 shown in FIG. 11 is approximately the same as that in FIG. 1, a detailed description thereof is omitted. Ball bearings with double raceway are employed as the bearings 10 and 25.

Figure 12:
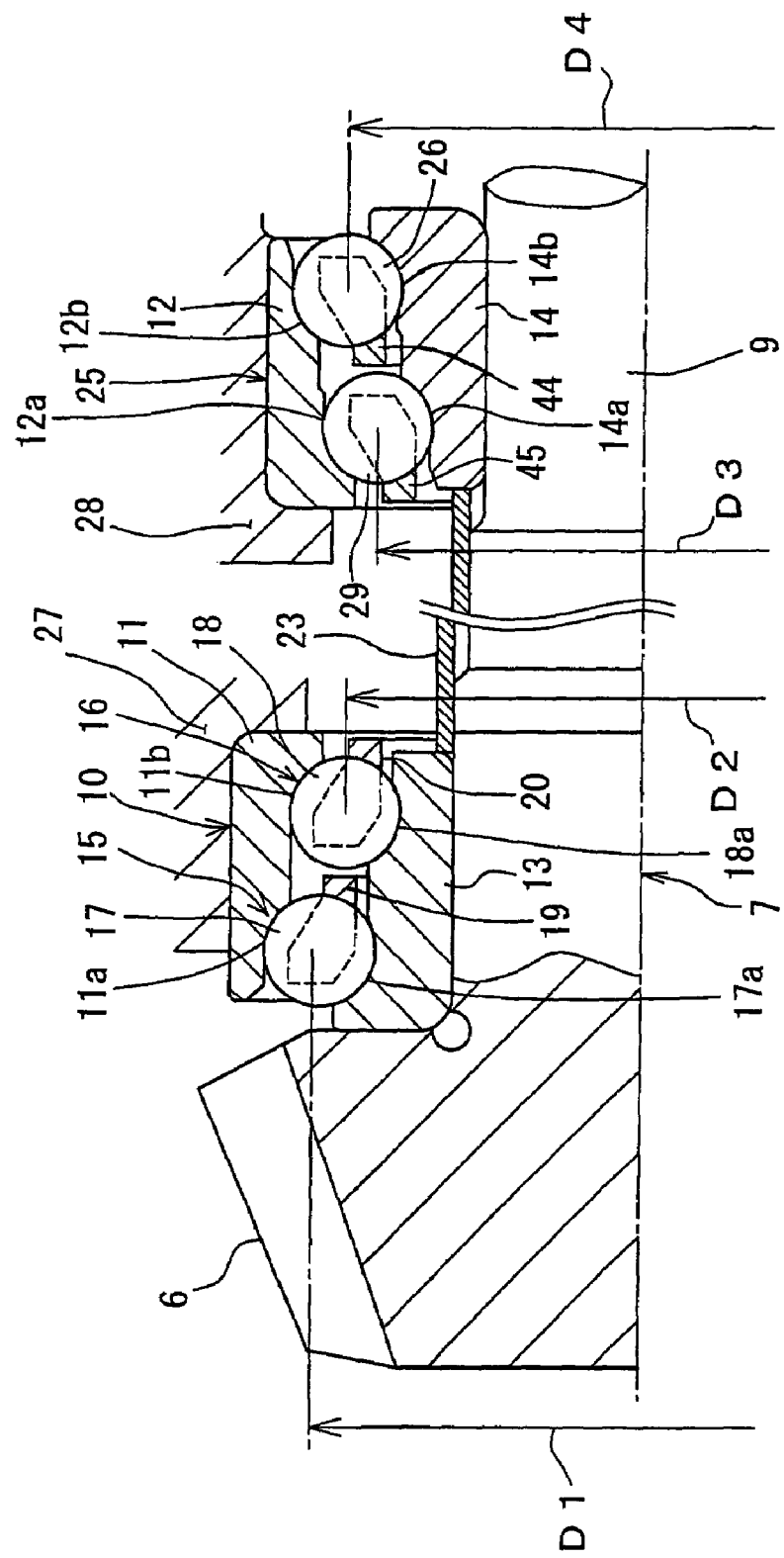
FIG. 12 is a cross sectional view of the ball bearing with double raceway in the differential apparatus shown in FIG. 11.

With reference to FIG. 12, the bearing 10 close to the pinion gear has a single outer ring member 11, an inner ring member 13, ball rows 15 and 16, and cages 19 and 20. In the bearing 10, a diameter of the ball 17 in the large-diameter side ball row 15 is equal to a diameter of the ball 18 in the small-diameter side ball row 16. A pitch circle diameter D1 of the large-diameter side ball row 15 is set larger than a pitch circle diameter D2 of the small-diameter side ball row 16. The bearing 10 having the ball rows 15 and 16 is called a tandem type ball bearing with double raceway.

The bearing 25 apart from the pinion gear is constituted by a single outer ring member 12 having a small-diameter raceway surface 12a close to the pinion gear and having a large-diameter raceway surface 12b apart from the pinion gear, a single inner ring member 14 having a small-diameter raceway surface 14a opposing to the small-diameter raceway surface 12a in a diametrical direction and having a large-diameter raceway surface 14b opposing to the large-diameter raceway surface 12b in the diametrical direction, and a plurality of balls 29 and 26 respectively arranged in the small diameter side and the large diameter side.

Figure 13:
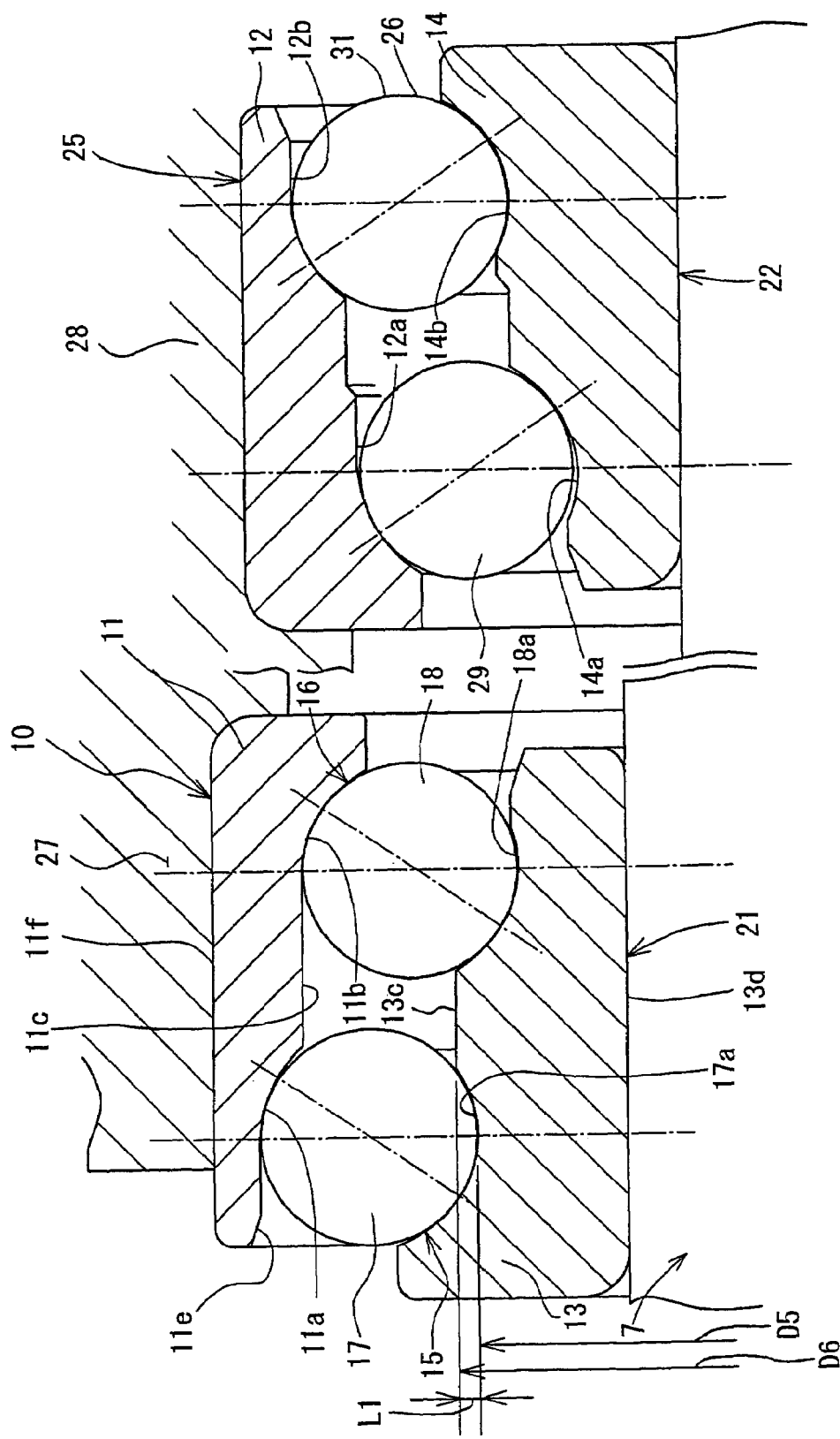
FIG. 13 is an enlarged cross sectional view of the ball bearing with double raceway shown in FIG. 12 in which a part of the ball bearing with raceway is omitted.

FIG. 13 is an enlarged cross sectional view drawn by omitting the cages 20 and 45 of the bearings 10 and 25 as a matter of convenience. As shown in the drawing, in accordance with this, embodiment, a bottom diameter D5 of a large-diameter raceway surface 17a of the inner ring member 13 is set a length L1 smaller than a shoulder diameter D6 of a shoulder portion 13c of a small-diameter raceway surface 18a close to the large-diameter raceway surface. In accordance with this structure, the large-diameter raceway surface 17a is positioned close to the inner diameter in comparison with the shoulder portion 13c. In the case where the large-diameter side ball row 15 is positioned close to the inner diameter, a ball diameter and an angle of inclination of the application line are not changed.

In this case, in the embodiment mentioned above, a diameter of a tubular surface 13a between both the raceway surfaces 17a and 18a is formed slightly larger than a diameter of a bottom of the large-diameter raceway surface 17a, thereby being used as a structure for preventing the ball 17 from escaping to another side in the axial direction.

On the contrary, in this embodiment, the bottom diameter D5 of the large-diameter raceway surface 17a of the inner ring member 13 is set the length L1 smaller than the shoulder diameter D6 of the shoulder portion 13c of the small-diameter raceway surface 18a close to the large-diameter raceway surface, thereby being positioned close to the inner diameter. Positioning close to the inner diameter means positioning the bottom diameter D5 of the large-diameter raceway surface 17a close to the inner diameter on the basis of the shoulder diameter D6 of the shoulder portion 13c.

In accordance with this structure, the large-diameter side ball row 15 having the large pitch circle diameter can be positioned close to the inner diameter in comparison with the conventional structure, and an outer diameter surface 11f of the outer ring raceway surface 11 can be positioned close to the inner diameter by just that much.

In this embodiment, since the bottom diameter D5 of the large-diameter raceway surface 17a of the inner ring member 13 is positioned closer to the inner diameter than the shoulder diameter D6 of the shoulder portion 13c of the small-diameter raceway surface 18a close to the large-diameter raceway surface, the shoulder portion 13c of the small-diameter raceway surface 18a close to the large-diameter raceway surface is used as the escape prevention structure.

In the bearing 25, the diameters of the balls 29 and 26 are set to be equal to each other. With reference to FIG. 12, the pitch circle diameter D4 of the large-diameter side ball row by the ball 26 is set larger than the pitch circle diameter D3 of the small-diameter side ball row by the ball 29. The bearing 25 mentioned above is called a tandem type ball bearing with double raceway.

FIG. 14A shows the bearing 10 in accordance with the present invention, and FIG. 14B shows a tandem type ball bearing with double raceway 110 as a comparative embodiment. In the bearing 110, a bottom diameter of a large-diameter raceway surface 113a of an inner ring member 113 is set to be equal to a shoulder diameter of a shoulder portion 113c of a small-diameter raceway surface 113b close to the large-diameter raceway surface.

FIG. 14A is an enlarged cross sectional view of the tandem type bearing 10 in which the balls 17 and 18 are respectively held at the uniform positions in the circumferential direction by the cages 19 and 20. As illustrated, the outer diameter surface 11f of the outer ring member 11 of the bearing 10 is positioned a length L2 closer to the inner diameter than an outer diameter surface 111c of an outer ring member 111 of the bearing 110. In other words, an outer diameter of the bearing 10 becomes smaller.

At the time of assembling the differential apparatus 1 having the structure mentioned above, the inner ring member 13, the cages 19 and 20 and the balls 17 and 18 are assembled as the inner ring side assembly in the outer ring member 11. Further, the inner ring member 14, the cages 44 and 45 and the balls 26 and 29 are assembled as the inner ring side assembly in the outer ring member 12 in the same manner as that of the embodiment mentioned above. Further, when the nut 42 is screwed with the screw portion 40, the preload is applied to the bearing 10 and the bearing 25, in the same manner as mentioned above. Further, reserving of the oil for lubrication and a lubricating method thereof are the same as mentioned above.

In accordance with the bearing 10 having the structure mentioned above, since the bottom diameter of the large-diameter raceway surface 17a of the inner ring member 13 is set smaller than the shoulder diameter of the shoulder portion 13c of the small-diameter raceway surface 18a close to the large-diameter raceway surface, the outer diameter of the bearing 10 can be made small, thereby downsizing the differential apparatus 1 using the bearing 10 mentioned above.

On the contrary, in the case where the bottom diameter of the large-diameter raceway surface 17a of the inner ring member 13 is set smaller than the shoulder diameter of the shoulder portion 13c of the small-diameter raceway surface 18a close to the large-diameter raceway surface, and the outer diameter of the outer ring member 11 of the bearing 10 is not changed, the interval between the large-diameter raceway surfaces 17a and 11a increases by such a length that the bottom diameter of the large-diameter raceway surface 17a is made smaller, and the diameter of the ball 17 interposed between the large-diameter raceway surfaces 17a and 11a can be made larger.

When the diameter of the ball 17 becomes large, a load capacity of the bearing 10 is increased, so that a long service life can be obtained, and an indentation resistance is also improved. Further, since the load capacity of the ball 17 close to the pinion to which the greater load is applied in comparison with the ball 18 apart from the pinion gear is made larger, the load application to the balls 17 and 18 is shared in an even manner. Accordingly, the life of the balls 17 and 18 is averaged, and a system life of the entire bearing 10 is extended.

In the present embodiment, the ball bearing with double raceway having the smaller rolling resistance than the tapered roller bearing is used as the bearing close to the pinion gear to which the large load is applied in comparison with the side apart from the pinion gear. Accordingly, a rotation torque becomes smaller than the case of the conventionally employed tapered roller bearing, and the efficiency of the differential apparatus 1 can be improved. Further, since the ball bearing with double raceway is used in place of the ball bearing with single raceway, the load capacity can be made larger than that of the ball bearing with single raceway, and a sufficient supporting rigidity can be obtained.

The bearing 10 employs the tandem type angular contact ball bearing with double raceway in which the pitch circle diameter D1 of the large-diameter side ball row 15 close to the pinion gear is made larger than the pitch circle diameter D2 of the small-diameter side ball row 16, thereby increasing the number of the balls in the large diameter side close to the pinion gear to which the greater load is applied in the case where the balls 17 and 18 in both the ball rows 15 and 16 have the same diameter and allowing the bearing to handle the great load.

In this case, with respect to the bearing 25, in the same manner as the bearing 10, the diametrical thickness from the inner diameter surface of the inner ring member 14 to the outer diameter surface of the outer ring member 12 may be made smaller by setting the bottom diameter of the large-diameter raceway surface 14b of the inner ring member 14 smaller than the shoulder diameter of the small-diameter raceway surface 14a close to the large-diameter raceway surface. Further, the bearing apart from the pinion gear may be constituted by an angular contact ball bearing with single raceway or a tapered roller bearing forming a back-to-back duplex bearing together with the bearing 10.

Figure 15:
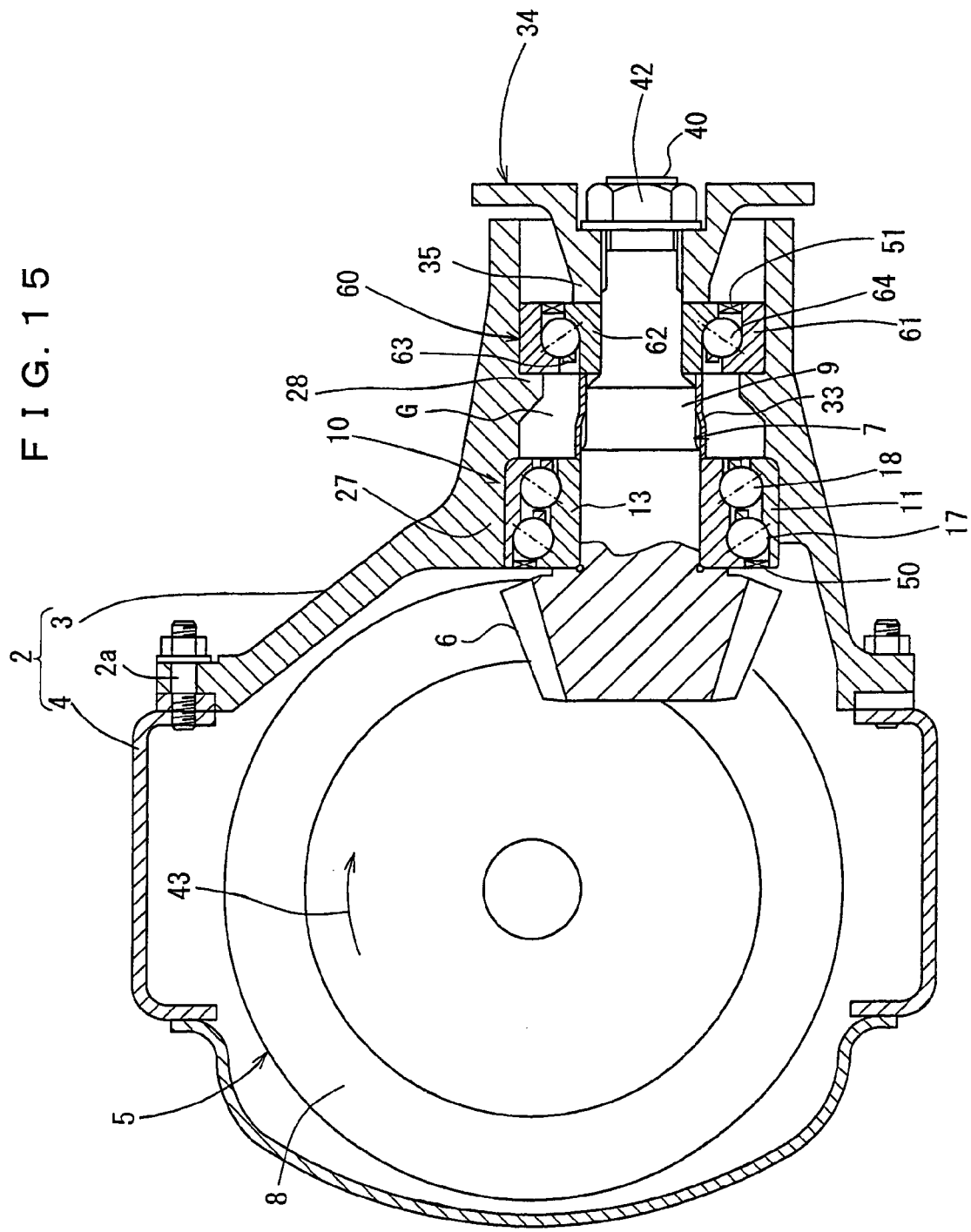
FIG. 15 is a cross sectional view showing an entire structure of a differential apparatus in accordance with a modified embodiment of the present invention.
Figure 16:
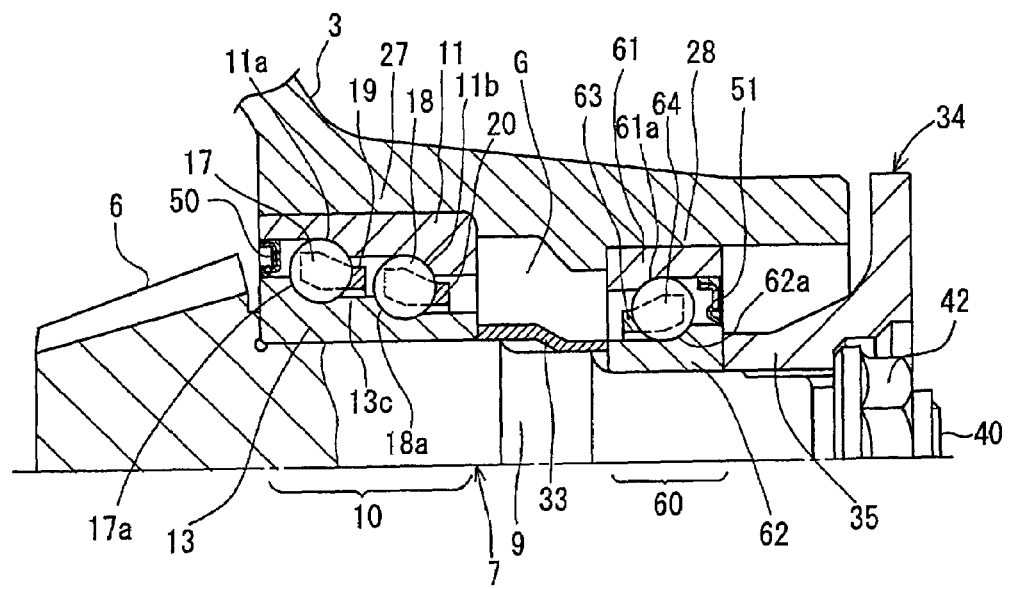
FIG. 16 is a cross sectional view of a bearing for supporting a pinion shaft in the differential apparatus shown in FIG. 15.
Figure 17A:
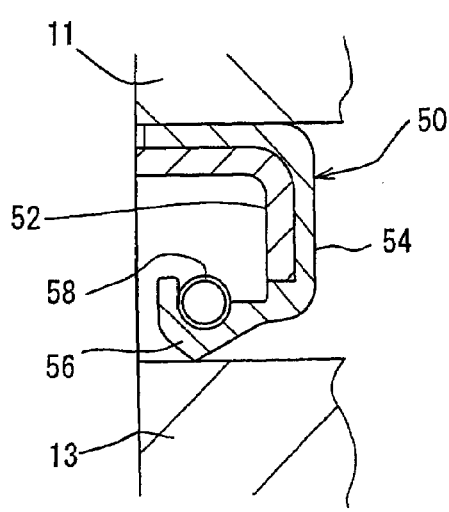
FIG. 17A is an enlarged cross sectional view of a seal member of the bearing for supporting the pinion shaft shown in FIG. 16.
Figure 17B:
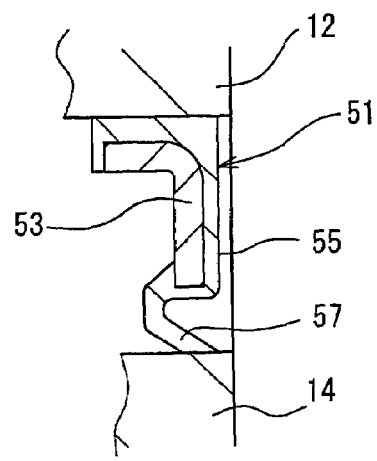
FIG. 17B is an enlarged cross sectional view of another seal member of the bearing for supporting the pinion shaft shown in FIG. 16.

A modified embodiment in accordance with the present invention is shown in FIGS. 15 to 17. In this modified embodiment, the bearing apparatus for supporting the pinion shaft is structured by the ball bearing with double raceway and the ball bearing with single raceway. FIG. 15 is a cross sectional view of a differential apparatus to which the bearing apparatus for supporting the pinion shaft in accordance with the present modified embodiment is applied, FIG. 16 is a cross sectional view of the bearing apparatus for supporting the pinion shaft in the differential apparatus shown in FIG. 15, and FIGS. 17A and 17B are enlarged cross sectional views of a seal portion of the bearing apparatus for supporting the pinion shaft in FIG. 16.

In the present modified embodiment, the tandem type angular contact ball bearing with double raceway is used as the bearing 10 close to the pinion gear, and the angular contact ball bearing with single raceway is used as a bearing 60 apart from the pinion gear.

Figure 14:
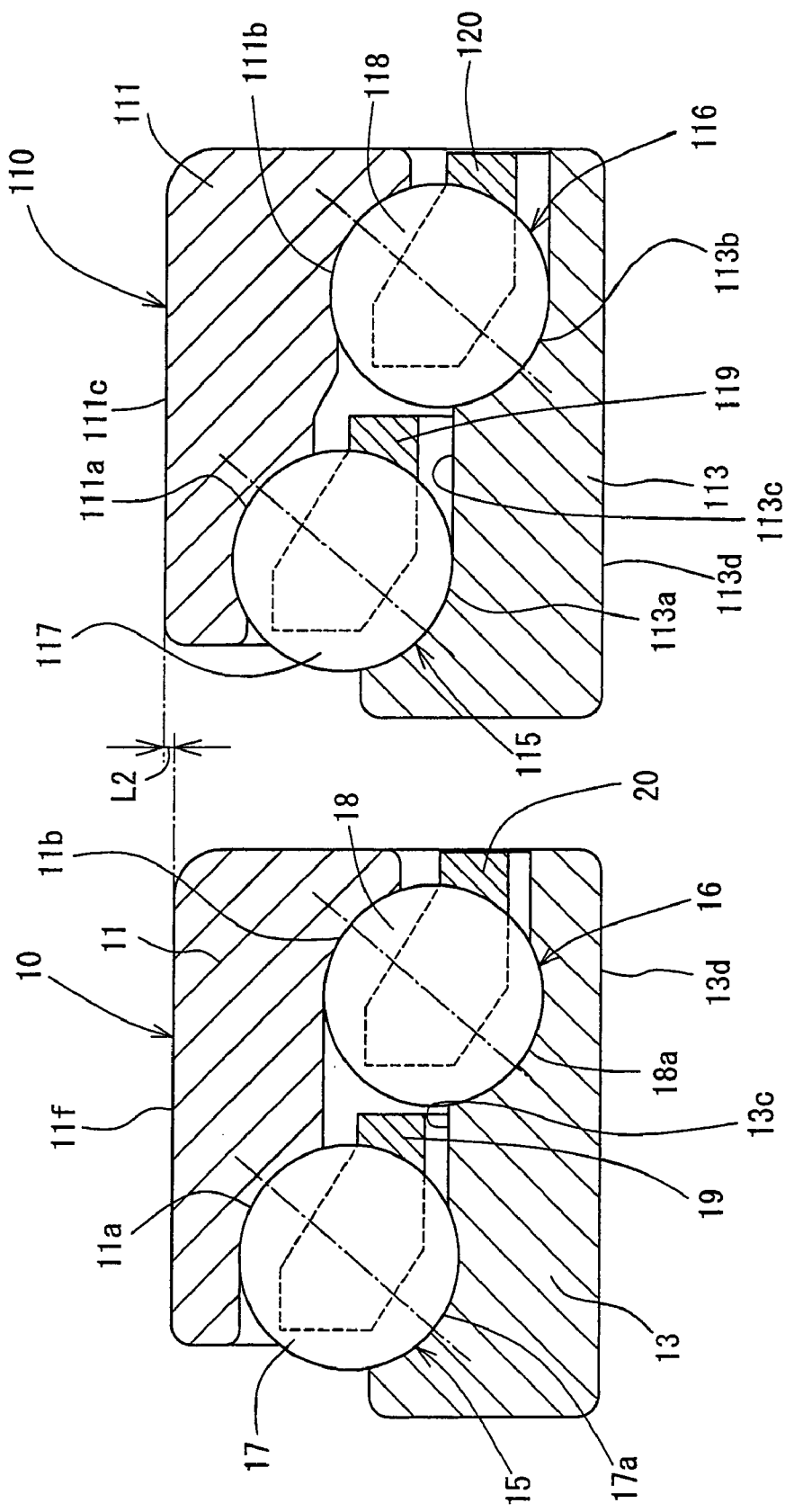
FIG. 14A is a cross sectional view describing a feature of the ball bearing with double raceway.
FIG. 14B is a cross sectional view describing the feature of the ball bearing with double raceway in the same manner as FIG. 14A.

The bearing 10 is constituted by an outer ring member 11 having outer ring raceway surfaces 11a and 11b, an inner ring member 13 having inner ring raceway 17a and 18a, and a large-diameter side ball 17 and a small-diameter side ball 18 respectively held by cages 19 and 20. In the bearing 10, as shown in FIG. 14, a bottom diameter of the large-diameter raceway surface 17a of the inner ring member 13 is set smaller than an outer diameter of a shoulder portion 13c of the small-diameter raceway surface 18a close to the large-diameter raceway surface, that is, a shoulder diameter.

The bearing 60 is constituted by an outer ring 61 having an outer ring raceway 61a, an inner ring 62 having an inner ring raceway 62a, and a ball 64 held by a cage 63.

Seal members 50 and 51 are provided in an end portion close to the pinion gear and an end portion of the bearing 60 apart from the pinion gear. A grease G is charged into an annular space between the outer ring member 11 of the bearing 10 and the inner ring member 13, an annular space between the outer ring member 12 of the bearing 60 and the inner ring member 14, and a space between the bearing 10 and the bearing 60 and between the shaft portion 9 of the pinion shaft 7 and the rear case 3, owing to the seal members 50 and 51.

The seal member 50 arranged in the end portion of the bearing 10 close to the pinion gear is of a type called an oil seal, and the seal member 51 arranged in the end portion of the bearing 60 apart from the pinion gear is of a type called a bearing seal.

With reference to FIGS. 17A and 17B, the seal members 50 and 51 are respectively constituted by annular core bars 52 and 53, and elastic bodies 54 and 55 in which rubber or the like is vulcanized and bonded to the annular core bars 52 and 53. Lip portions 56 and 57 which are in contact with outer peripheral surfaces of the inner ring members 13 and 62 with a predetermined clamping force are formed in the elastic bodies 54 and 55. The lip portion 56 mainly prevents an inflow of a gear oil, and the lip portion 57 mainly has a function of inhibiting muddy water or foreign matter from making an intrusion from an external portion of the bearing.

Further, the lip portion 56 of the seal member 50 is structured so as to increase a sealing property as much as possible by being forcibly pressed against the inner ring member 13 by a spring ring 58, thereby securely preventing the oil from making an intrusion into the inner portion of the bearing.

In the seal member 51, an inner diameter of the lip portion 57 is set smaller by a predetermined amount than an outer diameter of the shoulder portion of the inner ring 62, and the seal member 51 is brought into contact with the inner ring 62 owing to the size difference in a state in which the lip portion 57 is elastically expanded in diameter.

The bearings 10 and 60 may be exposed to a temperature between 130 and 150° C. Accordingly, an acrylic rubber, a heat resisting acrylic rubber and the like are preferably employed as a material of the elastic bodies 54 and 55 in the respective seal members 50 and 51. The heat resisting acrylic rubber may be an ethylene-acrylic rubber in which an ethylene and an acrylic ester are combined as a main component of a copolymer composition.

Further, taking heat resistance into consideration, as a material of the grease G, it is preferable to employ a diurea grease or an ester grease compatible with the gear oil. In particular, there is preferably employed, for example, trade name KNG170 manufactured by Japan Grease Co., Ltd., trade name Martemp SB-M manufactured by Kyodo Fats and Oils Co., Ltd., and the like. KNG170 is structured such that a base oil is constituted by a poly-α olefin mineral oil, a thickening agent is constituted by a diurea, and a working temperature range is between −30° C. and +150° C. Martemp SB-M is structured such that a base oil is constituted by a synthetic hydrocarbon, a thickening agent is constituted by a diurea, and a working temperature range is between −40° C. and +200° C.

The differential apparatus 1 shown in FIGS. 1 and 11 is of an oil lubricating type. Accordingly, it is necessary to form an oil introduction passage and an oil recycling passage within the differential case 2. However, the differential apparatus 1 in accordance with the modified embodiment is of a grease lubricating type. Therefore, it is not necessary to form an oil introduction passage and an oil recycling passage within the differential case 2, in contrast to the oil lubrication. Thus, a downsizing and a weight saving can be achieved in the differential apparatus 1. Further, the bearing apparatus is not affected by foreign matter in the oil in the differential apparatus 1. Accordingly, a bearing life can be improved.

The sealed space in which the grease G is charged includes the annular space between the outer ring member 11 of the bearing 10 and the inner ring member 13, the annular space between the outer ring member 12 of the bearing 60 and the inner ring member 14, and the space between the bearing 10 and the bearing 60 and between the shaft portion 9 of the pinion shaft 7 and the rear case 3. Accordingly, a sufficient amount of grease G to lubricate the bearings 10 and 60 can be secured.

In this case, the bearing apart from the pinion gear may be constituted by a tandem type angular contact ball bearing with double raceway or a tapered roller bearing.

Figure 18:
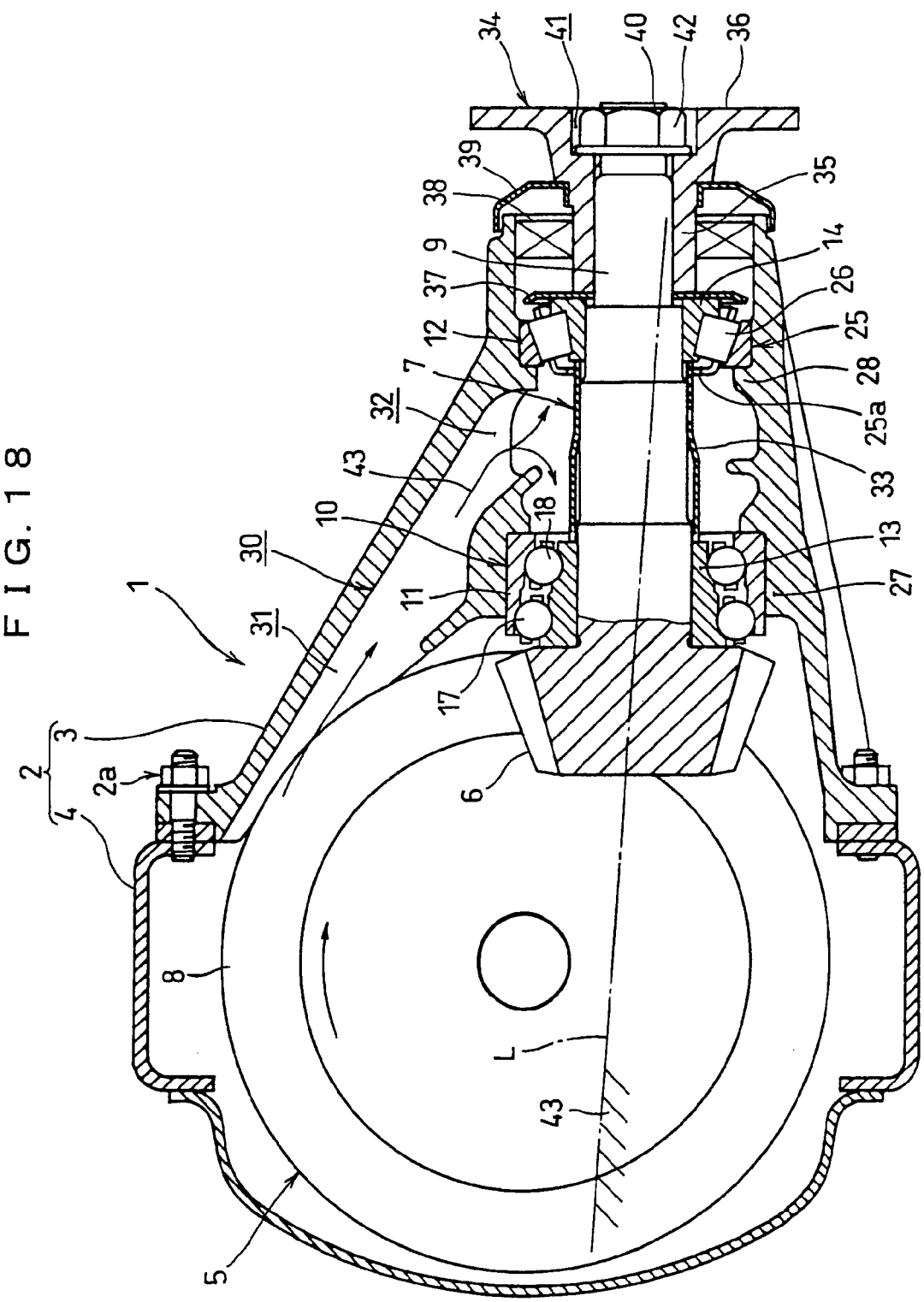
FIG. 18 is a cross sectional view showing an entire structure of a differential apparatus in accordance with further the other preferable embodiment of the present invention.
Figure 19:
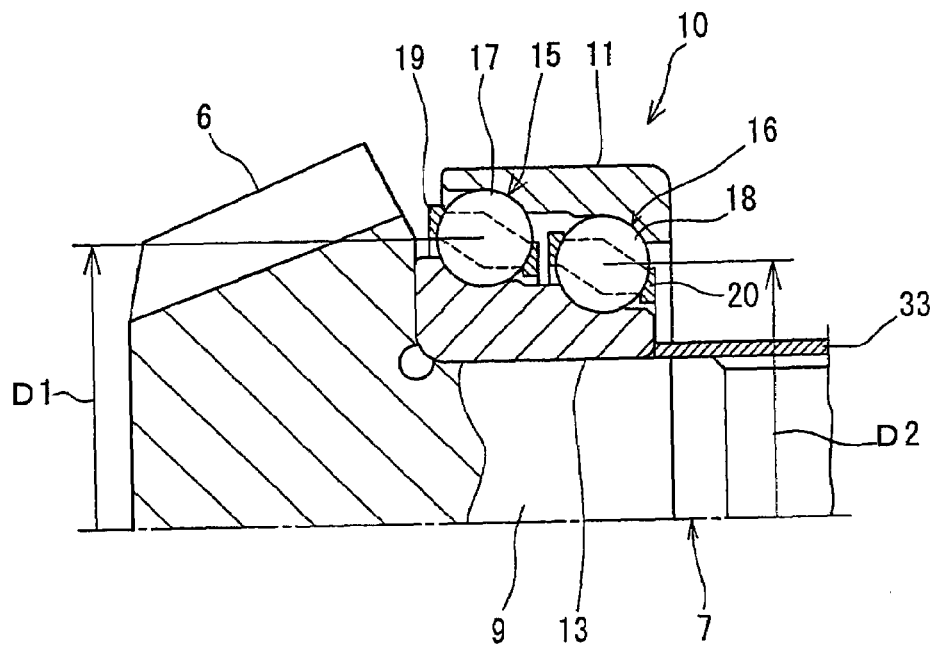
FIG. 19 is an enlarged cross sectional view of a main portion in a state in which an inner ring side assembly and an outer ring side assembly in FIG. 18 are assembled.
Figure 20:
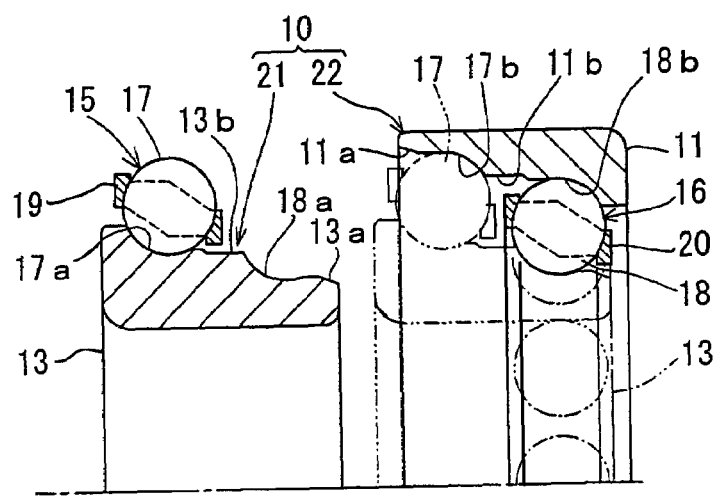
FIG. 20 is an exploded cross sectional view in a state in which the ball bearing with double raceway in FIG. 18 is disassembled into the inner ring side assembly and the outer ring side assembly.

(2) A description is given of the ball bearing with double raceway in accordance with the other embodiment of the present invention with reference to FIGS. 18 to 20. In this embodiment, a bearing 10 is provided in one side of the shaft portion 9 of the pinion shaft 7 and a tapered roller bearing 25 is provided in another side of the shaft portion 9 of the pinion shaft 7, as shown in FIG. 18.

With reference to FIG. 19, the bearing 10 is a tandem type ball bearing with double raceway having an outer ring member 11, an inner ring member 13, one side ball row 15 and another side ball row 16 respectively having different pitch circle diameters D1 and D2, and cages 19 and 20. With reference to FIG. 20, the bearing 10 is constituted by an inner ring side assembly 21 and an outer ring side assembly 22. The bearing 10 is structured by assembling the inner ring side assembly 21 and the outer ring side assembly 22 with each other.

The inner ring side assembly 21 is constituted by the inner ring member 13, and one side ball row 15 assembled in the inner ring member 13 so as to be held in a circumferential uniform position via the cage 19. The outer ring side assembly 22 is constituted by the outer ring member 11, and another side ball row 16 assembled in the outer ring member 11 so as to be held in a circumferential uniform position via the cage 20.

A large-diameter raceway surface 17*a* and a small-diameter raceway surface 18*a* of balls 17 and 18 in the respective rows are formed in the middle of an outer peripheral surface of the inner ring member 13, and a large-diameter raceway surface 17*b* and a small-diameter raceway surface 18*b* of the balls 17 and 18 in the respective rows are formed in the middle of an inner peripheral surface of the outer ring member 11, respectively. Flat surface portions 13*b* and 11*b* are respectively formed between the large-diameter raceway surface 17*a* and the small-diameter raceway surface 18*a*, and between the large-diameter raceway surface 17*b* and the small-diameter raceway surface 18*b*. In accordance with the structure, the outer peripheral surface of the inner ring member 13 is formed into a step shape, and the inner peripheral surface of the outer ring member 11 is also formed into a step shape.

With reference to FIG. 19, the diameters of the balls 17 and 18 in the respective rows are set to be equal, and a pitch circle diameter D2 of another side ball row 16 is set smaller than a pitch circle diameter D1 of one side ball row 15. A first guide surface 13*a* sequentially contracted in diameter toward another side is formed in another side end portion of the outer peripheral surface in the inner ring member 13. A second guide surface 11*a* sequentially contracted in diameter toward one side and inclined is formed in one side end portion of the outer peripheral surface in the outer ring member 11.

The bearing 25 has a single outer ring member 12, a single inner ring member 14 arranged inside the outer ring member in a diametrical direction, a plurality of rollers with single raceway 26 interposed between the outer ring member 12 and the inner ring member 14, and a cage 25*a* holding the rollers 26 in circumferential uniform positions. The inner ring member 14, the cage 25*a* and the plurality of rollers 26 are formed as an assembly independent from the outer ring 12 so as to be assembled in the outer ring member 12. An outer ring raceway surface of the roller 26 is formed on an inner peripheral surface of the outer ring member 12, and an inner ring raceway surface of the roller 26 is formed on an outer peripheral surface of the inner ring member 14, respectively.

Annular walls 27 and 28 for attaching the bearing are formed inside the front case 3. The outer ring member 11 of the bearing 10 and the outer ring member 12 of the bearing 25 are respectively fitted into and attached to inner peripheral surfaces of the annular walls 27 and 28.

The inner ring member 13 of the bearing 10 is inserted into one side end portion of the shaft portion 9 of the pinion shaft 7. The inner ring member 14 of the bearing 25 is inserted into the middle of the shaft portion 9 of the pinion shaft 7. An end surface of the bearing 10 in the inner ring member 13 is brought into contact with the end surface of the pinion gear 6 in an axial direction. A plastic spacer 33 is interposed between opposing end surfaces in the inner ring member 13 of the bearing 10 and the inner ring member 14 of the bearing 25. The plastic spacer 33 is outward fitted into the middle of the shaft portion 9 of the pinion shaft 7.

Since the other structures than the structure in which the tapered roller bearing 25 is employed in another side of the shaft portion 9 of the pinion shaft 7 are the same as the structure of the differential apparatus 1 shown in FIG. 1, the same reference numerals are attached thereto and a description thereof is omitted.

Next, a description is given of an assembling method of the differential apparatus 1 mentioned above. First, with reference to FIG. 20, with respect to the inner ring member 13, one side ball row 15 is fitted into one side inner ring raceway surface, that is, the large-diameter raceway surface 17*a* in a state in which one side ball row 15 is held in the cage 19, thereby forming the inner ring side assembly 21. Further, with respect to the outer ring member 11, another side ball row 16 is fitted into the small-diameter raceway surface 18*b* in a state in which another side ball row 16 is held in the cage 20, thereby forming the outer ring side assembly 22.

Next, in a state in which the front case 3 and the rear case 4 are still separated, the outer ring member 11 of the outer ring side assembly 22 in the bearing 10 is assembled in the front case 3. At this time, the outer ring member 11 of the outer ring side assembly 22 is pressure inserted up to an axial predetermined position where the outer ring member 11 is brought into contact with the step portion formed in the annular wall 27 from one side opening of the front case 3. Further, the outer ring member 12 of the tapered roller bearing 25 is pressure inserted up to an axial predetermined position where the outer ring member 12 is brought into contact with the step portion formed in the annular wall 28 from another side opening of the front case 3.

In addition to this, the inner ring side assembly 21 is assembled in the shaft portion 9 of the pinion shaft 7. In other words, the inner ring member 13 of the inner ring side assembly 21 is pressure inserted into the shaft portion 9 of the pinion shaft 7, and the inner ring side assembly 21 is positioned close to the pinion gear 6 in the shaft portion 9 of the pinion shaft 7.

In the manner mentioned above, the pinion shaft 7 to which the inner ring side assembly 21 is mounted is inserted from the small diameter side thereof, and from one side opening of the front case 3, in such a manner that the ball 17 of the inner ring side assembly 21 is fitted into another side outer ring raceway surface of the outer ring 11, that is, the large-diameter raceway surface 17b, and the ball 18 of the outer ring side assembly 22 is fitted into another side inner ring raceway surface of the inner ring member 13, that is, the small-diameter raceway surface 18a. At this time, the ball 17 close to the inner ring side assembly 21 is guided by the second guide surface 11a in the outer ring member 11 close to the outer ring side assembly 22 so as to be smoothly fitted into the large-diameter raceway surface 17b of the outer ring member 11. Further, the first guide surface 13a of the inner ring member 13 is brought into contact with the ball 18 close to the outer ring side assembly 22, whereby the inner ring side assembly 21 is guided so as to be concentrically positioned to the outer ring side assembly 22, and the inner ring side assembly 21 is smoothly assembled with respect to the outer ring side assembly 22.

Next, the plastic spacer 33 is outward fitted and inserted into the shaft portion 9 of the pinion shaft 7 from another side opening of the front case 3. Next, the assembly constituted by the inner ring member 14, the cage 25a and the roller 26 in the tapered roller bearing 25 is attached to the shaft portion 9 of the pinion shaft 7 from another side opening of the front case 3. In this case, the inner ring member 14 of the assembly is pressure inserted into the shaft portion 9 of the pinion shaft 7, and the roller 26 is fitted into the outer ring raceway surface of the outer ring member 12.

Thereafter, the shielding plate 37 is inserted into the shaft portion 9 of the pinion shaft 7 from another side opening of the front case 3, the oil seal 39 is attached, the seal protection cup 39 is mounted to another side opening portion of the front case 3, and the body portion 35 of the companion flange 34 is inserted to the seal protection cup 39 so as to bring the end surface thereof into contact with the shielding plate 37. Subsequently, a predetermined preload is applied to the balls 17 and 18 in both rows of the ball bearing with double raceway 10 and the roller 26 of the tapered roller bearing 25 by screwing the nut 42 into the screw portion 40 of the shaft portion 9 and deforming the plastic spacer 33.

In the differential apparatus 1 having the structure mentioned above, a lubricating oil 43 is reserved within the differential case 2 at level L when the apparatus 1 is not operating. The oil 43 is spattered up in accordance with a rotation of the ring gear 8 at the time of operating, is introduced so as to be supplied to the bearings 10 and 25 through the oil circulation passage 30 within the front case 3, and circulates within the differential case 2 so as to lubricate the bearings 10 and 25.

As mentioned above, the bearing 10 for rotatably supporting the shaft portion 9 of the pinion shaft 7 at one side is constituted by the inner ring side assembly 21 and the outer ring side assembly 22. Further, the inner ring side assembly 21 is constituted by the inner ring member 13, and one side ball row 15 assembled in the inner ring member 13 via the cage 19, and the outer ring side assembly 22 is constituted by the outer ring member 11, and another side ball row 16 assembled in the outer ring member 11 via the cage 20.

It is not necessary to move another side ball 18 so as to pass through the large-diameter raceway surface 17b of one side ball 17 in the case of assembling the inner ring side assembly 21 in the outer ring side assembly 22 at the time of assembling the differential apparatus 1, by previously assembling another side ball 18 in the outer ring member 11, as the outer ring side assembly 22, in the manner mentioned above. Accordingly, another side ball 18 is not damaged by the stepped portion of the inner peripheral surface (the shoulder portion of the flat surface portion 11b) in the outer ring member 11. Further, it is not necessary to move another side ball 18 at the time of assembling the inner ring side assembly 21 and the outer ring side assembly 22, thereby eliminating the work of fitting another side ball 18 into the small-diameter raceway surface 18b of the outer ring member 11 at the time of assembling the ball bearing with double raceway 10, and the bearing 10 is easily assembled.

Further, in accordance with the embodiment of the present invention, since the ball bearing with double raceway 10 with a small rolling resistance is used as the roller bearing close to the pinion gear 6 to which the great thrust load is applied, the rotation torque becomes smaller in comparison with the conventionally used tapered roller bearing. Accordingly, the efficiency of the differential apparatus 1 can be improved. Further, since the ball bearing with double raceway 10 is employed in place of the ball bearing with single raceway, the load capacity can be made large in comparison with the ball bearing with single raceway, and a sufficient supporting rigidity can be obtained.

In addition, the bearing 10 employs the tandem type ball bearing with double raceway in which the pitch circle diameter D1 of one side ball row 15, that is, the ball row 15 close to the pinion gear 6 is set larger than the pitch circle diameter D2 of another side ball row 16, thereby increasing the number of the balls 17 in the ball row 16 close to the pinion gear 6 to which the axial load is applied, and allowing the ball row to handle the great load.

Figure 21:
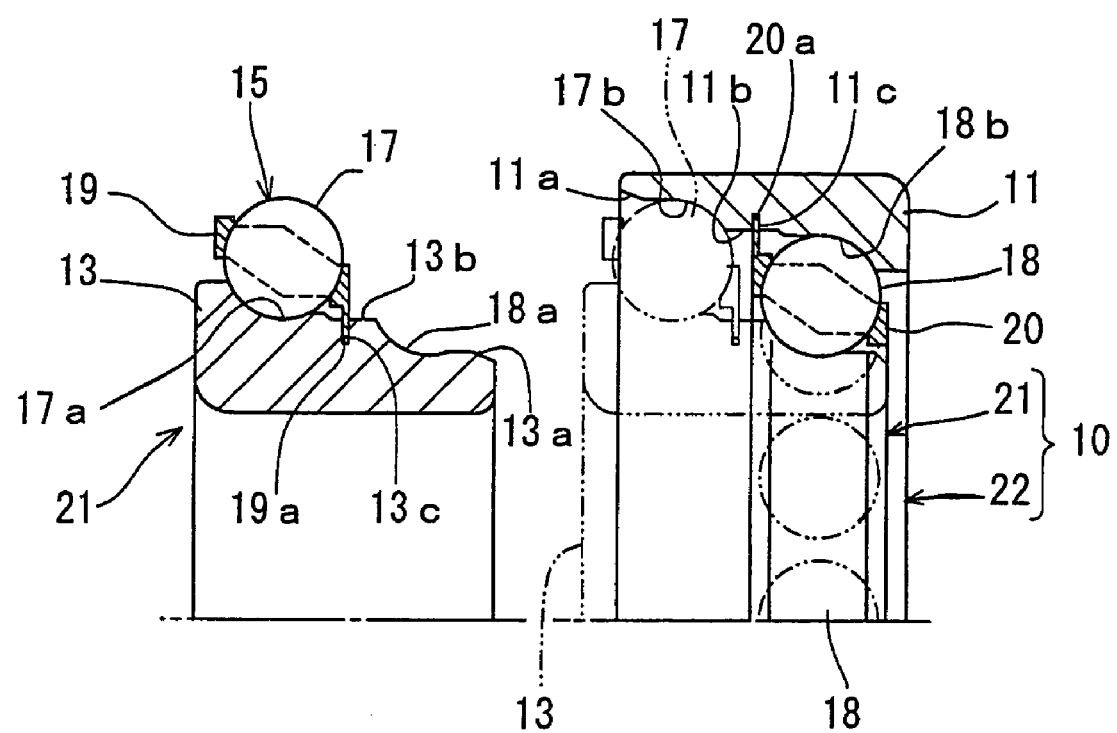
FIG. 21 is an exploded cross sectional view of a ball bearing with double row in accordance with the further other preferable embodiment of the present invention.
Figure 22:
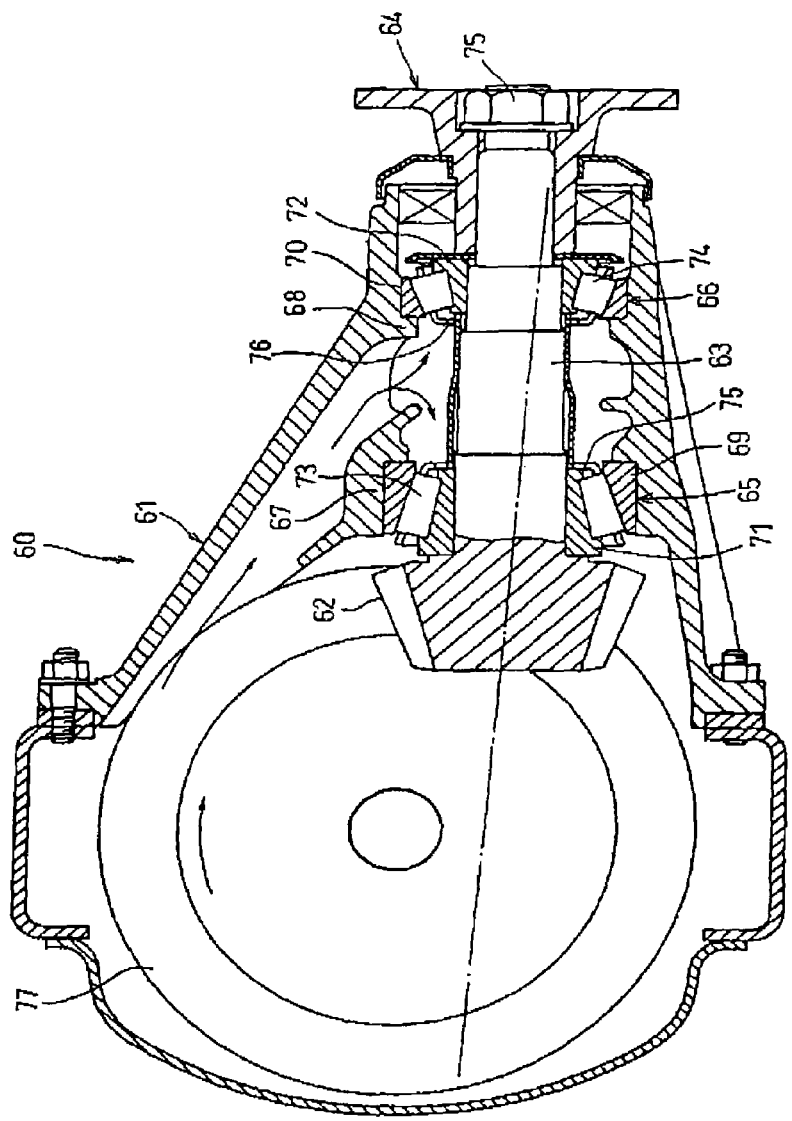
FIG. 22 is a cross sectional view showing an entire structure of a differential apparatus in accordance with a conventional embodiment.

A description is given of further another embodiment in accordance with the present invention with reference to FIG. 21. A bearing 10 has an inner ring side assembly 21 and an outer ring side assembly 22. A groove 13c depressed in a diametrical direction is formed in a flat surface portion 13b between a large-diameter raceway surface 17a and a small-diameter raceway surface 18a in the inner ring member 13 of the inner ring side assembly 21. A protruding portion 19a fitted into the groove 13c is formed in a cage 19 in the inner ring side assembly 21. A groove 11c depressed in a diametrical direction is formed in a flat surface portion 11b between a large-diameter raceway surface 17b and a small-diameter raceway surface 18b in the outer ring member 11 of the outer ring side assembly 22.

The grooves 13c and 11c and the protruding portions 19a and 20a in the inner ring side assembly 21 and the outer ring side assembly 22 respectively form locking portions for inhibiting the cages 19 and 20 from moving in the axial direction. The groove 13c and the protruding portion 19a, and the groove 11c and the protruding portion 20a are arranged at predetermined intervals in a circumferential direction.

The protruding portion 20a fitted into the groove 11c is formed in the cage 20 in the outer ring side assembly 22. Since other structures in the inner ring side assembly 21 and other structures in the outer ring side assembly 22 are the same as those of the embodiment mentioned above, the same reference numerals are attached thereto, and a description is omitted. Since other structures of the differential apparatus 1 are the same as those of the embodiment mentioned above, a description thereof is omitted by referring to FIG. 18.

In the structure mentioned above, the protruding portion 19a of the cage 19 is fitted into the groove 13c at the time of assembling the inner ring side assembly 21. The protruding portion 20a of the cage 20 is fitted into the groove 11c at the time of assembling the outer ring side assembly 22. In accordance with the structure mentioned above, the cage 19 and the ball 17 can be securely assembled in the inner ring member 13. Further, the cage 20 and the ball 18 can be securely assembled in the outer ring member 11. Since the assembling method of the differential apparatus 1 is the same as that of the embodiment mentioned above, a description thereof is omitted.

In accordance with the embodiment, the cages 19 and 20 respectively holding the balls 17 and 18 are inhibited by the engagement between the groove 13c and the protruding portion 19a, and the engagement between the groove 11c and the protruding portion 20a, respectively from moving in the axial direction. This can prevent the constituting parts of the inner ring side assembly 21 and the outer ring side assembly 22 from being dissembled at the time of transferring the ball bearing with double raceway 10, that is, the inner ring side assembly 21 and the outer ring side assembly 22 and assembling the inner ring side assembly 21 and the outer ring side assembly 22. Accordingly, the differential apparatus 1 can be more easily assembled. Since other operations and effects are the same as those of the embodiments mentioned above, a description thereof is omitted.

From the above description, it is believed obvious that modification and variation of the invention is possible.

What is claimed is:

1. An assembly for a ball bearing with double raceway comprising:
    an inner ring member provided with a large-diameter raceway surface and a small-diameter raceway surface from one toward another in an axial direction on an outer peripheral surface;
    double row cages arranged in outer diameter sides of the respective raceway surfaces in the inner ring member;
    each of said double row cages including:
        a large ring portion;
        a small ring portion disposed on an inner diameter side of said cage;
        said small ring portion including a first bridge surface axially extending by a predetermined distance from a lower portion of said small ring portion towards said large ring portion and a second bridge surface angularly extending at an incline from said first bridge surface towards a lower portion of said large ring portion; and
        said large ring portion including a first bridge surface axially extending by a predetermined distance from an upper portion of said large ring portion towards said small ring portion and a second bridge surface angularly extending at an incline from said first bridge surface of the large ring portion towards an upper portion of said small ring portion;
        said bridge surfaces together forming a single bridge for containing a single ball; and
    double ball rows respectively held in the cages,
    wherein the inner ring member, the respective cages and the respective ball rows are assembled in a non-separable manner, and are assembled in an outer ring member provided with a large-diameter raceway surface and a small-diameter raceway surface from one toward another in an axial direction on an inner peripheral surface in correspondence to both the raceway surfaces from one side in the axial direction.

2. An assembly for a ball bearing with double raceway as claimed in claim 1, wherein the respective ball rows include a large-diameter side ball row interposed between the large diameter raceway surface of the outer ring member and the large-diameter raceway surface of the inner ring member, and a small-diameter side ball row interposed between the small-diameter raceway surface of the outer ring member and the small-diameter raceway surface of the inner ring member, and a small-end side shoulder portion is formed in another side in the axial direction on the small-diameter raceway surface of the inner ring member, the small-end side shoulder portion having a larger diameter than a diameter of a bottom of the small-diameter raceway surface in the inner ring member and providing an obstruction for preventing the small-diameter side ball row from escaping to another side in the axial direction.

3. An assembly for a ball bearing with double raceway as claimed in claim 2, wherein an intermediate side shoulder portion is formed between the large-diameter raceway surface of the inner ring member and a small-diameter raceway surface of the inner ring member, the intermediate side shoulder portion having a larger diameter than a diameter of a bottom of the large-diameter raceways surface formed in the inner ring member and providing an obstruction for preventing the ball row of the large-diameter side assembly from escaping to another side in the axial direction.

4. An assembly for a ball bearing with double raceway as claimed in claim 2, wherein said inclined surface is formed between the large-diameter raceway surface and the small-diameter raceway surface in the inner ring member for guiding the ball of the large-diameter side ball row at the time of assembling three elements comprising the inner ring member, the respective ball rows and the respective cages in the outer ring member.

5. An assembly for a ball bearing with double raceway as claimed in claim 2, wherein the cage includes a large-diameter cage for holding the large-diameter side ball row, and a small-diameter cage for holding the small-diameter side ball row, the large-diameter cage is assembled in die large-diameter side ball row so as to be formed as a large-diameter side assembly, the small-diameter cage is assembled in the small-diameter side ball row so as to be formed as a small-diameter side assembly, and the large-diameter side assembly and the small-diameter side assembly are respectively assembled in the large-diameter raceway surface and the small-diameter raceway surface in the inner ring member in a non-separable manner.

6. A manufacturing method of a ball bearing with double raceway comprising:
    a first step of preparing an inner ring member provided with a large-diameter raceway surface and a small-diameter raceway surface from one toward another in an axial direction on an outer peripheral surface, double row cages arranged in outer diameter sides of the respective raceway surfaces in the inner ring member, and double ball rows respectively field in the double row cages, each of said double row cages including:
  a large ring portion;
  a small ring portion disposed on an inner diameter side of said cage;
  said small ring portion including a first bridge surface axially extending by a predetermined distance from a lower portion of said small ring portion towards said large ring portion and a second bridge surface angularly extending at an incline from said first bridge surface towards a lower portion of said large ring portion; and
  said large ring portion including a first bridge surface axially extending by a predetermined distance from an upper portion of said large ring portion towards said small ring portion and a second bridge surface angularly extending at an incline from said first bridge surface of the large ring portion towards an upper portion of said small ring portion;
  said bridge surfaces together forming a single bridge for containing a single ball;

a second step of assembling the inner ring member, the respective cages and the respective ball rows in a non-separable manner so as to obtain an assembly; and a third step of assembling the assembly in an outer ring member provided with a large-diameter raceway surface and a small-diameter raceway surface in correspondence to both the raceway surfaces from one side in the axial direction.

* * * * *